United States Patent
Guerra et al.

(10) Patent No.: US 9,515,929 B2
(45) Date of Patent: Dec. 6, 2016

(54) TRAFFIC DATA PRE-FILTERING

(71) Applicants: Keissy Guerra, Belfast (GB); Sandra Scott-Hayward, Belfast (GB); Sakir Sezar, Belfast (GB); Xin Yang, Belfast (GB)

(72) Inventors: Keissy Guerra, Belfast (GB); Sandra Scott-Hayward, Belfast (GB); Sakir Sezar, Belfast (GB); Xin Yang, Belfast (GB)

(73) Assignee: Netronome Systems, Inc., Santa Clara, CA (US)

( * ) Notice: Subject to any disclaimer, the term of this patent is extended or adjusted under 35 U.S.C. 154(b) by 517 days.

(21) Appl. No.: 13/929,809

(22) Filed: Jun. 28, 2013

(65) Prior Publication Data

US 2015/0003237 A1    Jan. 1, 2015

(51) Int. Cl.
*H04L 12/927* (2013.01)
*H04L 12/741* (2013.01)
*H04L 12/931* (2013.01)

(52) U.S. Cl.
CPC ............. *H04L 45/745* (2013.01); *H04L 49/00* (2013.01)

(58) Field of Classification Search
CPC ........... H04L 47/80; H04L 69/22; H04L 45/74
USPC ................ 370/230, 329, 392, 235, 252, 254
See application file for complete search history.

(56) References Cited

U.S. PATENT DOCUMENTS

| | | | | |
|---|---|---|---|---|
| 7,227,840 B1* | 6/2007 | Ferguson | ................ | H04L 47/10 370/230 |
| 8,879,550 B2* | 11/2014 | Anand | ................ | H04L 63/0227 370/389 |
| 9,055,004 B2* | 6/2015 | Edsall | .................... | H04L 49/253 |
| 2002/0191549 A1* | 12/2002 | McKinley | ........... | H04L 41/0213 370/254 |
| 2011/0122884 A1* | 5/2011 | Tsirkin | ....................... | G06F 9/00 370/412 |
| 2012/0314709 A1* | 12/2012 | Post | .................... | G06F 12/0802 370/392 |

* cited by examiner

*Primary Examiner* — Jamal Javaid
(74) *Attorney, Agent, or Firm* — Imperium Patent Works LLP; T. Lester Wallace; Mark D. Marrello

(57) ABSTRACT

A network appliance includes a first and second compliance checker and an action identifier. Each compliance checker includes a first and second lookup operator. Traffic data is received by the network appliance. A field within the traffic data is separated into a first and second subfield. The first lookup operator performs a lookup operation on the first subfield of the traffic data and generates a first lookup result. The second lookup operator performs a lookup operation on the second subfield of the traffic data and generates a second lookup result. A compliance result is generated by a lookup result analyzer based on the first and second lookup results. An action is generated by an action identifier based at least in part on the compliance result. The action indicates whether or not additional inspection of the traffic data is required. The first and second lookup operators may perform different lookup methodologies.

8 Claims, 24 Drawing Sheets

COMMAND-PUSH-PULL (CPP) DATA BUS
STRUCTURE

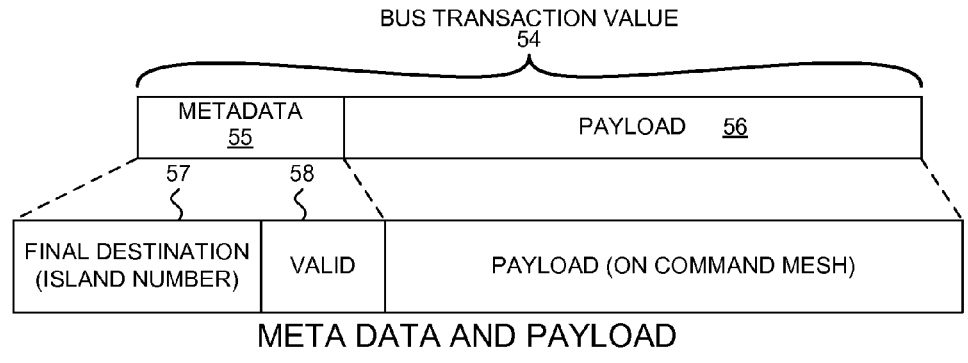

META DATA AND PAYLOAD

FIG. 3

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/ TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 4

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 5

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 6

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 7

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 8

ME ISLAND

MU ISLAND

ROUTER

PARALLEL RULE COMPLIANCE LOOKUP ARCHITECTURE

PARALLEL SUBFIELD LOOKUP ARCHITECTURE

PARALLEL RULE COMPLIANCE LOOKUP FLOWCHART

| 5-TUPLE RULES: | DESTINATION IP ADDRESS | SOURCE IP ADDRESS | DESTINATION PORT | SOURCE PORT | PROTOCOL |
|---|---|---|---|---|---|
| RULE #1 | 215.230.15.1 | 192.146.10.1 | 1299-1300 | XXXX | TCP |
| RULE #2 | 215.230.32.2 | 192.146.10.1 | 9000-9100 | XXXX | TCP |
| RULE #3 | 215.230.15.1 | 192.145.19.128/25 | 5000-5100 | XXXX | UDP |

128 DECIMAL = 80 HEXADECIMAL
255 DECIMAL = FF HEXADECIMAL

SET OF 5-TUPLE RULES

FIG. 15

TRAFFIC DATA
(E.G. PACKET)

| INCOMING PACKET: (5 TUPLE) | DESTINATION IP ADDRESS | SOURCE IP ADDRESS | DESTINATION PORT | SOURCE PORT | PROTOCOL |
|---|---|---|---|---|---|
|  | 215.230.15.1 | 192.145.19.186 | 5050 | 2020 | TCP |

19 DECIMAL = 13 HEXADECIMAL
186 DECIMAL = BA HEXADECIMAL

INCOMING TRAFFIC DATA
(PACKET 5-TUPLE)

FIG. 16

|  | SUB FIELD 1 | SUB FIELD 2 | SUB FIELD 3 | SUB FIELD 4 |
|---|---|---|---|---|
|  | 1$^{ST}$ 4 BITS | 2$^{ND}$ 4 BITS | 3$^{RD}$ 4 BITS | 4$^{TH}$ 4 BITS |
| HEXADECIMAL | 1 | 3 | B | A |
| BINARY | 0001 | 0011 | 1011 | 1010 |

BINARY VALUE SEPARATED IN 4-BIT WIDE GROUPS

FIG. 17

LOOKUP OPERATOR 211
(SEGMENT TREE LOOKUP)

| START POINT | END POINT | LABEL | COUNTER |
|---|---|---|---|
| 4 BITS | 4 BITS | 5 BITS | 12 BITS |

START POINT AND END POINT REPRESENT 4 BITS FROM A 16-BIT RANGE.
EACH NODE HAS A UNIQUE LABEL.
COUNTER INDICATES THE TOTAL NUMBER OF TIMES THE TREE HAS PASSED THROUGH THE NODE.

NODE INFORMATION

SINGLE SEGMENT TREE LOOKUP SEQUENTIAL LOGIC

EACH REGISTER IS PROGRAMMED WITH PASS/FAIL RESULT FOR THE ASSOCIATED NODE.
REGISTER VALUES ARE PROGRAMMED BASED UPON THE COMPLIANCE RULE.
REGISTER VALUE = 1 INDICATES THE SUB-FIELD IS IN COMPLIANCE WITH THE RULE.

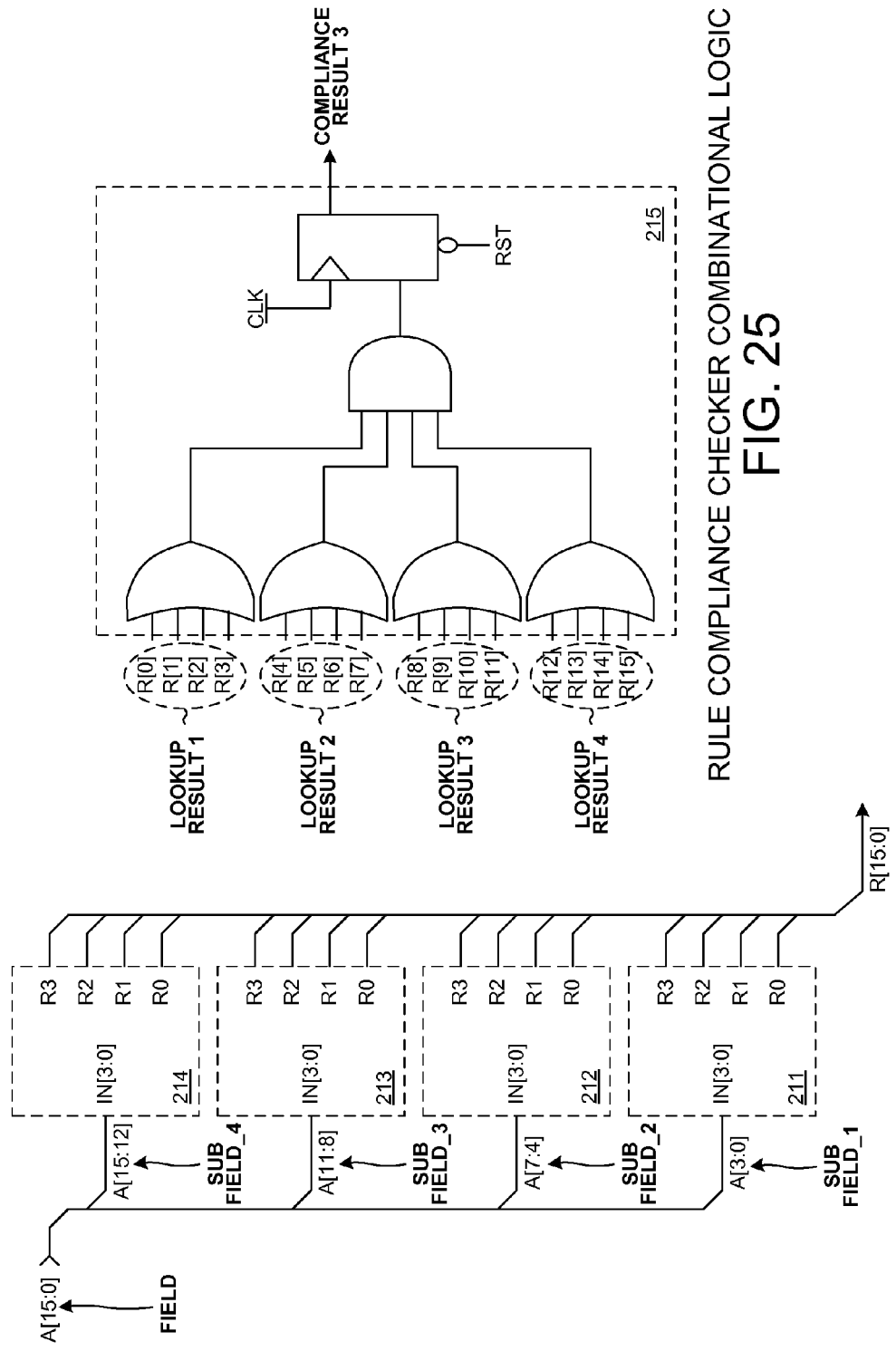

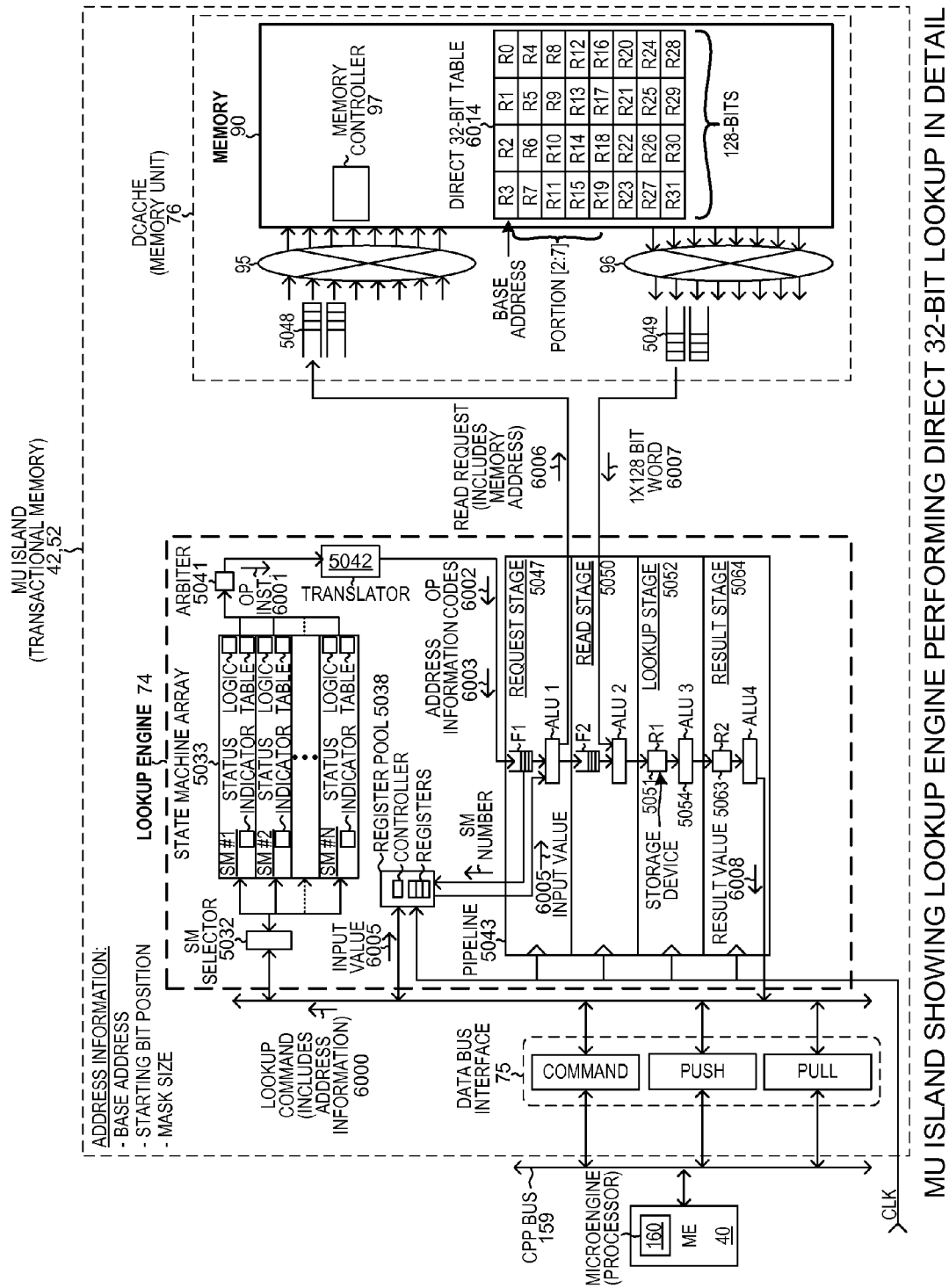

| | MEMORY LOCATION 3 32 BITS | MEMORY LOCATION 2 32 BITS | MEMORY LOCATION 1 32 BITS | MEMORY LOCATION 0 32 BITS |
|---|---|---|---|---|
| MEMORY WORD 0 | R3 | R2 | R1 | R0 |
| MEMORY WORD 1 | R7 | R6 | R5 | R4 |
| MEMORY WORD 2 | R11 | R10 | R9 | R8 |
| MEMORY WORD 3 | R15 | R14 | R13 | R12 |
| MEMORY WORD 4 | R19 | R18 | R17 | R16 |
| MEMORY WORD 5 | R23 | R22 | R21 | R20 |
| MEMORY WORD 6 | R27 | R26 | R25 | R24 |
| MEMORY WORD 7 | R31 | R30 | R29 | R28 |
DIRECT 32-BIT MEMORY PACKING SCHEME
FIG. 27
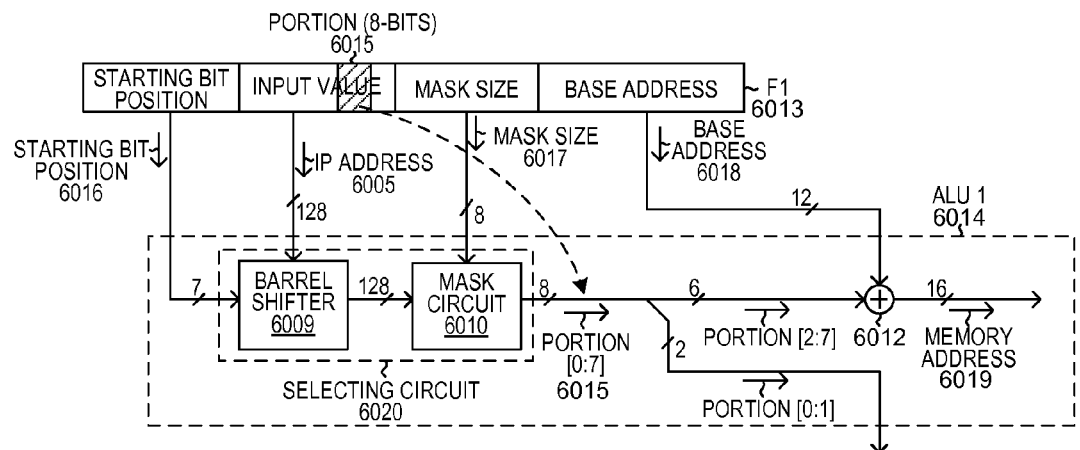
DIRECT 32-BIT REQUEST STAGE
FIG. 28
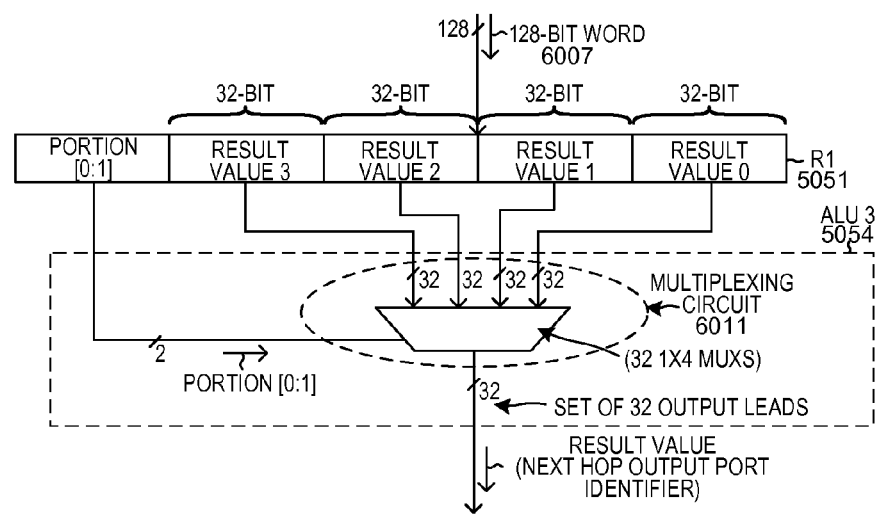
DIRECT 32-BIT LOOKUP STAGE
FIG. 29

DIRECT RESULT VALUE

DIRECT 32-BIT LOOKUP FLOWCHART

| | MEMORY LOCATION 3 32 BITS | MEMORY LOCATION 2 32 BITS | MEMORY LOCATION 1 32 BITS | MEMORY LOCATION 0 32 BITS |
|---|---|---|---|---|
| MEMORY WORD 0 | R1 | CAM 1 | R0 | CAM 0 |
| MEMORY WORD 1 | R3 | CAM 3 | R2 | CAM 2 |
| MEMORY WORD 2 | R5 | CAM 5 | R4 | CAM 4 |
| MEMORY WORD 3 | R7 | CAM 7 | R6 | CAM 6 |
| MEMORY WORD 4 | R9 | CAM 9 | R8 | CAM 8 |
| MEMORY WORD 5 | R11 | CAM 11 | R10 | CAM 10 |
| MEMORY WORD 6 | R13 | CAM 13 | R12 | CAM 12 |
| MEMORY WORD 7 | R15 | CAM 15 | R14 | CAM 14 |
DIRECT CAMR 32-BIT LOOKUP MEMORY PACKING
FIG. 33
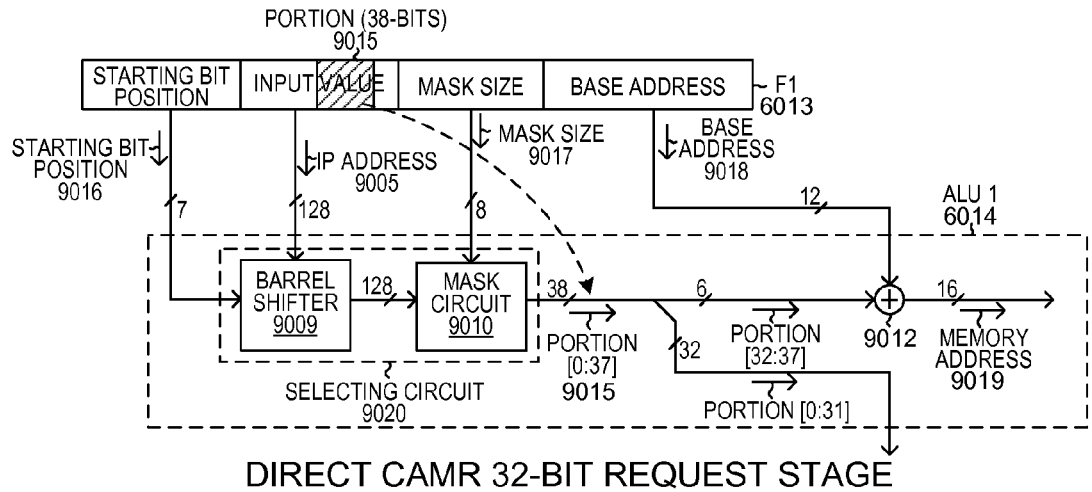
DIRECT CAMR 32-BIT REQUEST STAGE
FIG. 34
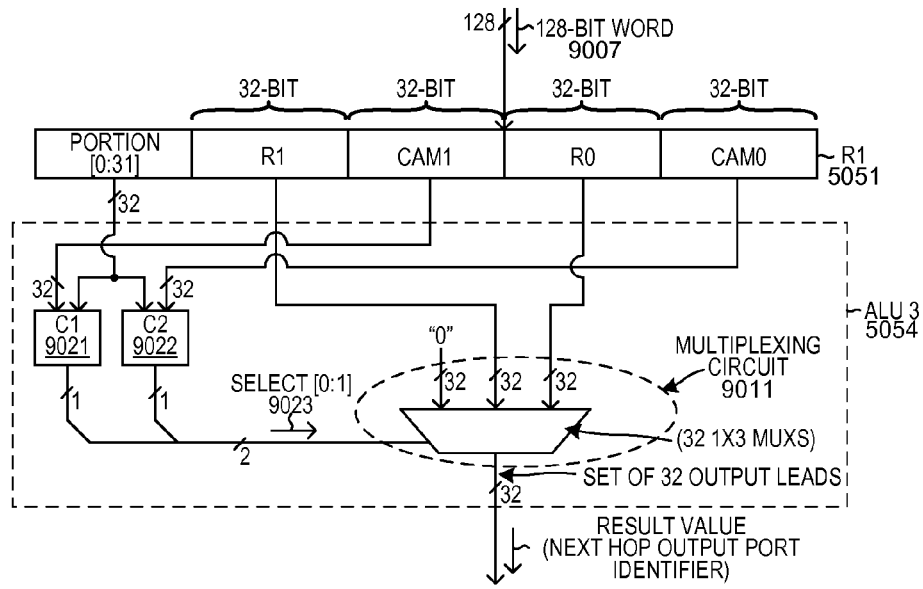
DIRECT CAMR 32-BIT LOOKUP STAGE
FIG. 35

CAMR 32 BIT LOOK-UP FLOWCHART

TRAFFIC DATA PRE-FILTERING

TECHNICAL FIELD

The described embodiments relate generally to managing network traffic data and more specifically to managing network traffic data by performing parallel lookup operations on subfields of the network traffic data.

BACKGROUND INFORMATION

A network processor is a device that executes programs to handle packet traffic in a data network. A network processor is also often referred to as a network flow processor or simply a flow processor. Examples include network processor integrated circuits on router line cards and in other network equipment. In one example, a network processor integrated circuit is capable of receiving packets, classifying and performing atomic operations on the packets and associated packet data, and transmitting packets. Processors on the integrated circuit are called upon to perform processing functions that include managing various queues of data to ensure various levels of Quality of Service (QOS) to various network clients. A processor on the integrated circuit may also be called upon to determine and to log updated activity and permission information into appropriate tables in memory. As throughput requirements increase, ways of adding processing power are sought.

In one specific example, a network processor integrated circuit uses the flexible and expandable IXP2800 architecture. The IXP2800 architecture allows multiple high-speed processors (referred to as microengines) to access the same memory resources via a common command/push/pull bus. Due to use of the IXP2800 architecture and multiple microengines, increased processing power is brought to bear on the tasks of identifying data structures using hash functions and of logging packet and byte count information. If more throughput is required, then more microengines can be employed. If less throughput is required, then fewer microengines can be employed. The NFP-3XXX and NFP-6XXX families of network processor integrated circuits available from Netronome Systems, Inc. of Santa Clara, Calif. include a selection of IXP2800-based network processor integrated circuits having different numbers of microengines.

SUMMARY

An Island-Based Network Flow Processor (IB-NFP) includes a plurality of islands that are interconnected by a configurable mesh Command/Push/Pull (CPP) data bus. A first of the islands includes a processor. A second of the islands includes a novel transactional memory. The CPP data bus includes a configurable command mesh, a configurable pull-id mesh, a configurable data0 mesh, and a configurable data1 mesh. The Island-Based Network Flow Processor is utilized to implement an efficient complex network traffic management in a non-uniform memory system.

In a first novel aspect, a network appliance includes a first and second compliance checker and an action identifier. Each compliance checker includes a first and second lookup operator. The first and second lookup operators perform the same lookup methodology. Traffic data is received by the network appliance. A field within the traffic data is separated into a first and second subfield. The first lookup operator performs a lookup operation on the first subfield of the traffic data and generates a first lookup result. The second lookup operator performs a lookup operation on the second subfield of the traffic data and generates a second lookup result. A compliance result is generated by a lookup result analyzer based on the first and second lookup results. An action is generated by an action identifier based at least in part on the compliance result. The action indicates whether or not additional inspection of the traffic data is required.

In a second novel aspect, a network appliance includes a first and second compliance checker and an action identifier. Each compliance checker includes a first and second lookup operator. The first and second lookup operators perform different lookup methodologies. Traffic data is received by the network appliance. A field within the traffic data is separated into a first and second subfield. The first lookup operator performs a lookup operation on the first subfield of the traffic data and generates a first lookup result. The second lookup operator performs a lookup operation on the second subfield of the traffic data and generates a second lookup result. A compliance result is generated by a lookup result analyzer based on the first and second lookup results. An action is generated by an action identifier based at least in part on the compliance result. The action indicates whether or not additional inspection of the traffic data is required.

In a third novel aspect, a network appliance includes a first and second compliance checker and an action identifier. Each compliance checker includes a first and second lookup operator. The first and second lookup operators perform different lookup methodologies. The first lookup operator is implemented in sequential logic. The second lookup operator is implemented by executable code running on a processor. Traffic data is received by the network appliance. A field within the traffic data is separated into a first and second subfield. The first lookup operator performs a lookup operation on the first subfield of the traffic data and generates a first lookup result. The second lookup operator performs a lookup operation on the second subfield of the traffic data and generates a second lookup result. A compliance result is generated by a lookup result analyzer based on the first and second lookup results. An action is generated by an action identifier based at least in part on the compliance result. The action indicates whether or not additional inspection of the traffic data is required.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is diagram of a bus transaction value communicated across the CPP data bus.

FIG. 4 is a table listing the parts of the command payload of the bus transaction value of FIG. 3, when the bus transaction value is a command sent across the command mesh of the CPP data bus.

FIG. 5 is a table listing the width and description of each field within the payload of a bus transaction value sent across the pull-id mesh of the CPP data bus.

FIG. 6 is a table listing the width and description of each field within the payload of a bus transaction value sent across the data0 or data1 mesh of the CPP data bus.

FIG. 7 is a table listing the width and description of each field within the data payload of a pull transaction.

FIG. 8 is a table listing the width and description of each field within the data payload of a push transaction.

FIG. 15 is a table describing three exemplary rules.

FIG. 16 is a table describing the contents of exemplary traffic data.

FIG. 17 is a table illustrating the separation of one field within the traffic data into multiple sub-fields.

FIG. 24 is a diagram illustrating four segment tree lookups with a common input and output bus.

FIG. 25 is a diagram illustrating a rule compliance checker combinational logic.

FIG. 26 is a detailed diagram of the lookup engine within an MU island performing a direct 32-bit lookup operation.

FIG. 27 is a diagram of the direct 32-bit lookup memory packing scheme.

FIG. 28 is a circuit diagram of the request stage of the pipeline within the lookup engine of FIG. 26.

FIG. 29 is a circuit diagram of the lookup stage of the pipeline within the lookup engine of FIG. 26.

FIG. 33 is a diagram of the CAMR 32-bit lookup memory packing scheme.

FIG. 34 is a circuit diagram of the request stage of the pipeline within the lookup engine of FIG. 32.

FIG. 35 is a circuit diagram of the lookup stage of the pipeline within the lookup engine of FIG. 32.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
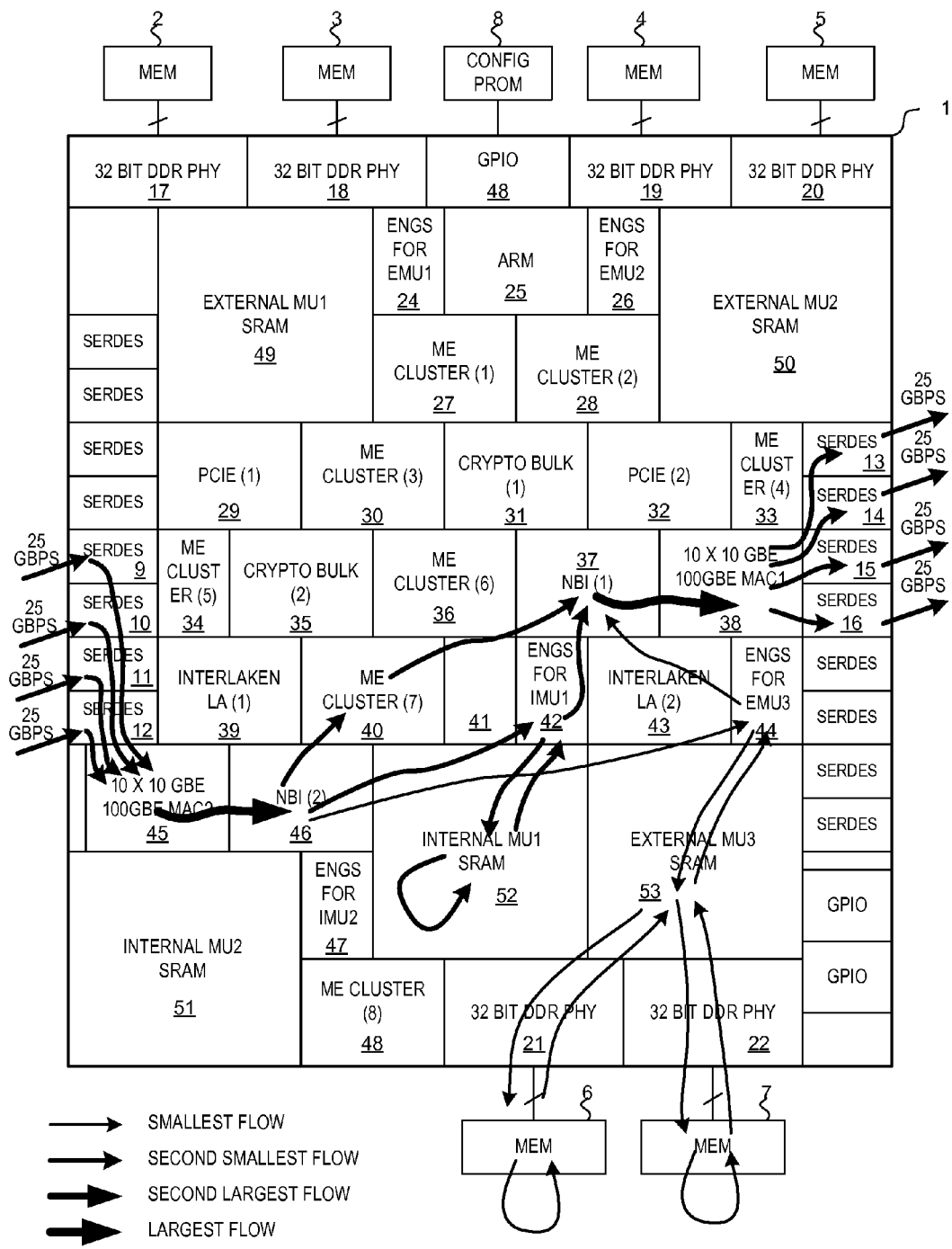
FIG. 1 is a top-down diagram of an Island-Based Network Flow Processor (IB-NFP) integrated circuit 1 and associated memory circuits 2-7.

FIG. 1 is a top-down diagram of an Island-Based Network Flow Processor (IB-NFP) integrated circuit 1 and associated memory circuits 2-7 in an MPLS router application. IB-NFP integrated circuit 1 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads.

SerDes circuits 9-12 are the first set of four SerDes circuits that are used to communicate with an external network via optical cables. A Serializer/Deserializer (SerDes) is a pair of functional blocks commonly used in high speed communications to compensate for limited input/output. These blocks convert data between serial data and parallel interfaces in each direction. The term "SerDes" generically refers to interfaces used in various technologies and applications. SerDes circuits 13-16 are the second set of four SerDes circuits that are used to communicate with a switch fabric (not shown) of the router. Each of these SerDes circuits 13-16 is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 1 accesses external memory integrated circuits 2-7 via corresponding 32-bit DDR physical interfaces 17-22, respectively. IB-NFP integrated circuit 1 also has several general purpose input/output (GPIO) interfaces. One of these GPIO interfaces 48 is used to access external CONFIG PROM 8.

In addition to the area of the input/output circuits outlined above, the IB-NFP integrated circuit 1 also includes two additional areas. The first additional area is a tiling area of islands 24-48. Each of the islands is either of a full rectangular shape, or is half the size of the full rectangular shape. For example, the island 29 labeled "PCIE (1)" is a full island. The island 34 below it labeled "ME CLUSTER (5)" is a half island. The functional circuits in the various islands of the tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

In addition to this tiling area of islands 24-48, there is a second additional area of larger sized blocks 49-53. The functional circuitry of each of these blocks is not laid out to consist of islands and half-islands in the way that the circuitry of islands 24-48 is laid out. The mesh bus structures do not extend into or over any of these larger blocks. The mesh bus structures do not extend outside of island 24-48. The functional circuitry of a larger sized block may connect by direct dedicated connections to an interface island and through the interface island achieve connectivity to the mesh buses and other islands.

The arrows in FIG. 1 illustrate an operational example of IB-NFP integrated circuit 1 within the MPLS router. 100 Gbps packet traffic is received onto the router via an optical cable (not shown), flows through an optics transceiver (not shown), flows through a PHY integrated circuit (not shown), and is received onto IB-NFP integrated circuit 1, is spread across the four SerDes I/O blocks 9-12. Twelve virtual input ports are provided at this interface. The symbols pass through direct dedicated conductors from the SerDes blocks 9-12 to ingress MAC island 45. Ingress MAC island 45 converts successive symbols delivered by the physical coding layer into packets by mapping symbols to octets, by performing packet framing, and then by buffering the resulting packets for subsequent communication to other processing circuitry. The packets are communicated from MAC island 45 across a private inter-island bus to ingress NBI (Network Bus Interface) island 46. In addition to the optical cable that supplies packet traffic into the IB-NFP integrated circuit from the router, there is another optical cable that communicates packet traffic in the other direction out of the IB-NFP integrated circuit and to the router.

For each packet received onto the IB-NFP in the example of FIG. 1, the functional circuitry of ingress NBI island 46 examines fields in the header portion to determine what storage strategy to use to place the packet into memory. In one example, NBI island 46 examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP. NBI island 46 examines a packet header, performs packet preclassification, determines that the packet is a fast-path packet, and determines that the header portion of the packet should be placed into a CTM (Cluster Target Memory) in ME (Microengine) island 40. The header portion of the packet is therefore communicated across the configurable mesh data bus from NBI island 46 to ME island 40. The CTM is tightly coupled to microengines in the ME island 40. The ME island 40 determines header modification and queuing strategy for the packet based on the packet flow (derived from packet header and contents) and the ME island 40 informs a second NBI island 37 of these. The payload portions of fast-path packets are placed into internal SRAM (Static Random Access Memory) MU block 52 and the payload portions of exception packets are placed into external DRAM 6 and 7.

Half island 42 is an interface island through which all information passing into, and out of, SRAM MU block 52 passes. The functional circuitry within half island 42 serves as the interface and control circuitry for the SRAM within block 52. For simplicity purposes in the discussion below, both half island 42 and MU block 52 may be referred to together as the MU island, although it is to be understood that MU block 52 is actually not an island as the term is used here but rather is a block. The payload portion of the incoming fast-path packet is communicated from NBI island 46, across the configurable mesh data bus to SRAM control island 42, and from control island 42, to the interface circuitry in block 52, and to the internal SRAM circuitry of block 52. The internal SRAM of block 52 stores the payloads so that they can be accessed for flow determination by the ME island.

In addition, a preclassifier in the ingress NBI island 46 determines that the payload portions for others of the packets should be stored in external DRAM 6 and 7. For example, the payload portions for exception packets are stored in external DRAM 6 and 7. Interface island 44, external MU SRAM block 53, and DDR PHY I/O blocks 21 and 22 serve as the interface and control for external DRAM integrated circuits 6 and 7. The payload portions of the exception packets are therefore communicated across the configurable mesh data bus from NBI island 46, to interface and control island 44, to external MU SRAM block 53, to 32-bit DDR PHY I/O blocks 21 and 22, and to external DRAM integrated circuits 6 and 7. At this point in the operational example, the packet header portions and their associated payload portions are stored in different places. The payload portions of fast-path packets are stored in internal SRAM in MU block 52, whereas the payload portions of exception packets are stored in external SRAM in external DRAMs 6 and 7.

ME island 40 informs second NBI island 37 where the packet headers and the packet payloads can be found and provides the second NBI island 37 with an egress packet descriptor for each packet. The egress packet descriptor indicates a queuing strategy to be used on the packet. Second NBI island 37 uses the egress packet descriptor to read the packet headers and any header modification from ME island 40 and to read the packet payloads from either internal SRAM 52 or external DRAMs 6 and 7. Second NBI island 37 places packet descriptors for packets to be output into the correct order. For each packet that is then scheduled to be transmitted, the second NBI island 37 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 37 then performs any indicated packet modification on the packet. The resulting modified packet then passes from second NBI island 37 and to egress MAC island 38.

Egress MAC island 38 buffers the packets, and converts them into symbols. The symbols are then delivered by conductors from the MAC island 38 to the four SerDes I/O blocks 13-16. From SerDes I/O blocks 13-16, the 100 Gbps outgoing packet flow passes out of the IB-NFP integrated circuit 1 and to the switch fabric (not shown) of the router. Eight virtual output ports are provided in the example of FIG. 1.

Figure 2:
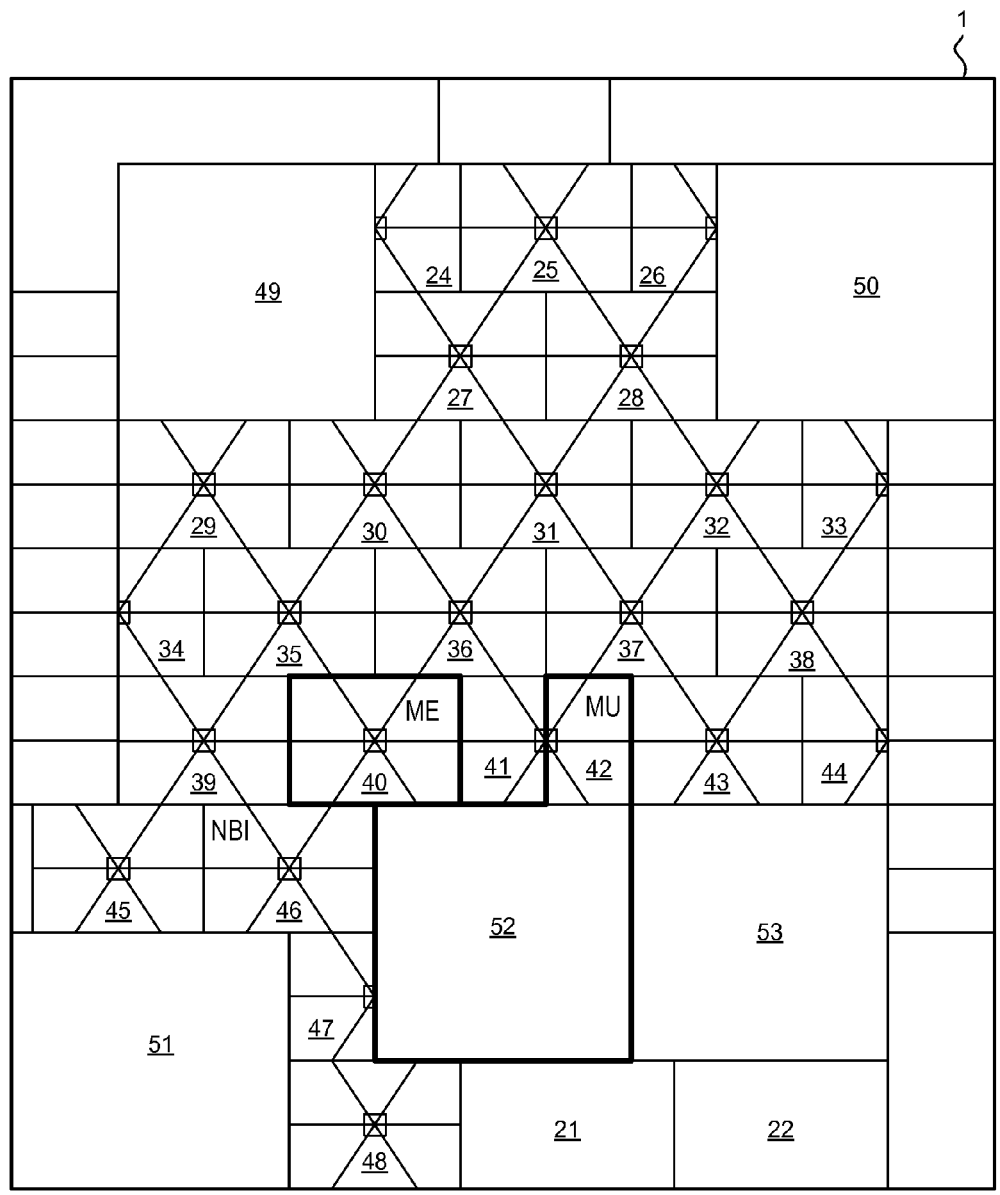
FIG. 2 shows the Command-Push-Pull (CPP) data bus structure that interconnects functional circuitry in the islands of FIG. 1.

General Description of the CPP Data Bus: FIG. 2 shows the Command-Push-Pull (CPP) data bus structure that interconnects functional circuitry in the islands of FIG. 1. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion to form the staggered pattern illustrated in FIG. 2. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

General Description of a Write That Results in a Pull: In one example of a CPP bus transaction, a microengine (a master) on ME island 40 uses the data bus interface of ME island 40 to perform a write operation to a hardware engine (a target) on MU half island 42, where the MU island 42 responds by performing a pull operation. To do this, the microengine on the ME island 40 uses the data bus interface to output a bus transaction value onto the command mesh of the CPP data bus. The format of the bus transaction value is as set forth in FIG. 3. A bus transaction value 54 includes a metadata portion 55 and a payload portion 56 as shown. The metadata portion 55 includes a final destination value 57 and a valid bit 58.

The functional circuitry that receives the bus transaction value and the data to be written is referred to as the "target" of the write operation. The write command is said to be "posted" by the master onto the command mesh. As indicated in FIG. 3, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master to the appropriate target, in this case to a hardware engine on MU island 42. All bus transaction values on the command mesh that originate from the same island that have the same final destination value will traverse through the configurable command mesh along the same one path all the way to the indicated final destination island.

A final destination island may include more than one potential target. The 4-bit target field of payload portion indicates which one of these targets in the destination island it is that is the target of the command. In the case of MU island 42, this 4-bit field indicates one of several hardware engines of the MU island 42. The 5-bit action field of the payload portion indicates that the command is a write. The 14-bit data reference field is a reference usable by the master to determine where in the master the data is to be found. The address field indicates an address in the target where the data is to be written. The length field indicates the amount of data.

The target (a hardware engine of MU island 42) receives the write command from the command mesh and examines the payload portion of the write command. From the action field the hardware engine in MU island 42 determines that it is to perform a write action. To carry out this action, the hardware engine posts a bus transaction value called a pull-id onto the pull-id mesh. FIG. 3 shows the format of the overall bus transaction value, and FIG. 4 shows the format of the payload. The final destination field of the metadata portion indicates the island where the master (in this case, a microengine on the ME island 40) is located. The target port field identifies which sub-circuit target it is within the target's island that is the target of the command. In this example, the target island is the MU island 42 so the sub-circuit is a hardware engine on the MU island. The pull-id is communicated through the pull-id mesh back to ME island 40.

The master in the ME island receives the pull-id from the pull-id mesh and uses the content of the data reference field of the pull-id to find the data. In the overall write operation, the master in the ME island knows the data it is trying to write into the MU island. The data reference value that is returned with the pull-id is used by the master in the ME island as a flag to match the returning pull-id with the write operation the ME had previously initiated.

The master on ME island 40 responds by sending the identified data to the target on MU island 42 across one of the data meshes data0 or data1 as a "pull" data bus transaction value. The term "pull" means that the data of the operation passes from the master (a microengine on the ME island) to the target (a hardware engine on the MU island). The term "push" means that the data of the operation passes from the target to the master. The format of the "pull" data bus transaction value sent in this sending of data is also as indicated in FIG. 3. The format of the payload portion in the case of the payload being pull data is as set forth in FIG. 7. The first bit of the payload portion is asserted. This bit being a digital high indicates that the transaction is a data pull as opposed to a data push. The target on MU island 42 then receives the data pull bus transaction value across the data1 or data0 mesh. The data received by the hardware engine as the data for the write is the content of the data field (the data field of FIG. 7) of the pull data payload portion.

FIG. 6 is a generic description of the data payload, and FIG. 7 is a description of the data payload when the first bit of the data payload indicates the data payload is for a pull transaction. FIG. 8 is a description of the data payload when the first bit of the data payload indicates that payload is for a push transaction.

General Description of a Read That Results in a Push: In another example, a master (for example, a microengine on ME island 40) uses the data bus interface of island 40 to perform a read operation from a target (for example, a hardware engine on MU island 42), where the target responds by performing a push operation. The microengine circuitry in ME island 40 uses the data bus interface of island 40 to output (to "post") a bus transaction value onto the command mesh bus of the configurable mesh CPP data bus. In this case, the bus transaction value is a read command to read data from the target hardware engine in MU island 42. The format of the read command is as set forth in FIGS. 4 and 5. The read command includes a metadata portion and a payload portion. The metadata portion includes the 6-bit final destination value that indicates the island where the target is located. The action field of the payload portion of the read command indicates that the command is a read. The 14-bit data reference field is usable by the master as a flag to associate returned data with the original read operation the master previously initiated. The address field in the payload portion indicates an address in the target where the data is to be obtained. The length field indicates the amount of data.

The target (a hardware engine of MU island 42) receives the read command and examines the payload portion of the command. From the action field of the command payload portion the target determines that it is to perform a read action. To carry out this action, the target uses the address field and the length field to obtain the data requested. The target then pushes the obtained data back to the master across data mesh data1 or data0. To push the data, the target outputs a push bus transaction value onto the data1 or data0 mesh. FIG. 4 sets forth the format of the overall push bus transaction value and FIG. 8 sets forth the format of the payload portion of this push bus transaction value. The first bit of the payload portion indicates that the bus transaction value is for a data push, as opposed to a data pull. The master (the microengine of ME island 40) receives the bus transaction value of the data push from the data mesh bus. The master in the ME island then uses the data reference field of the push bus transaction value to associate the incoming data with the original read command, and from the original read command determines where the pushed data (data in the date field of the push bus transaction value) should be written into the master. The master then writes the content of the data field into the master's memory at the appropriate location.

Figure 9:
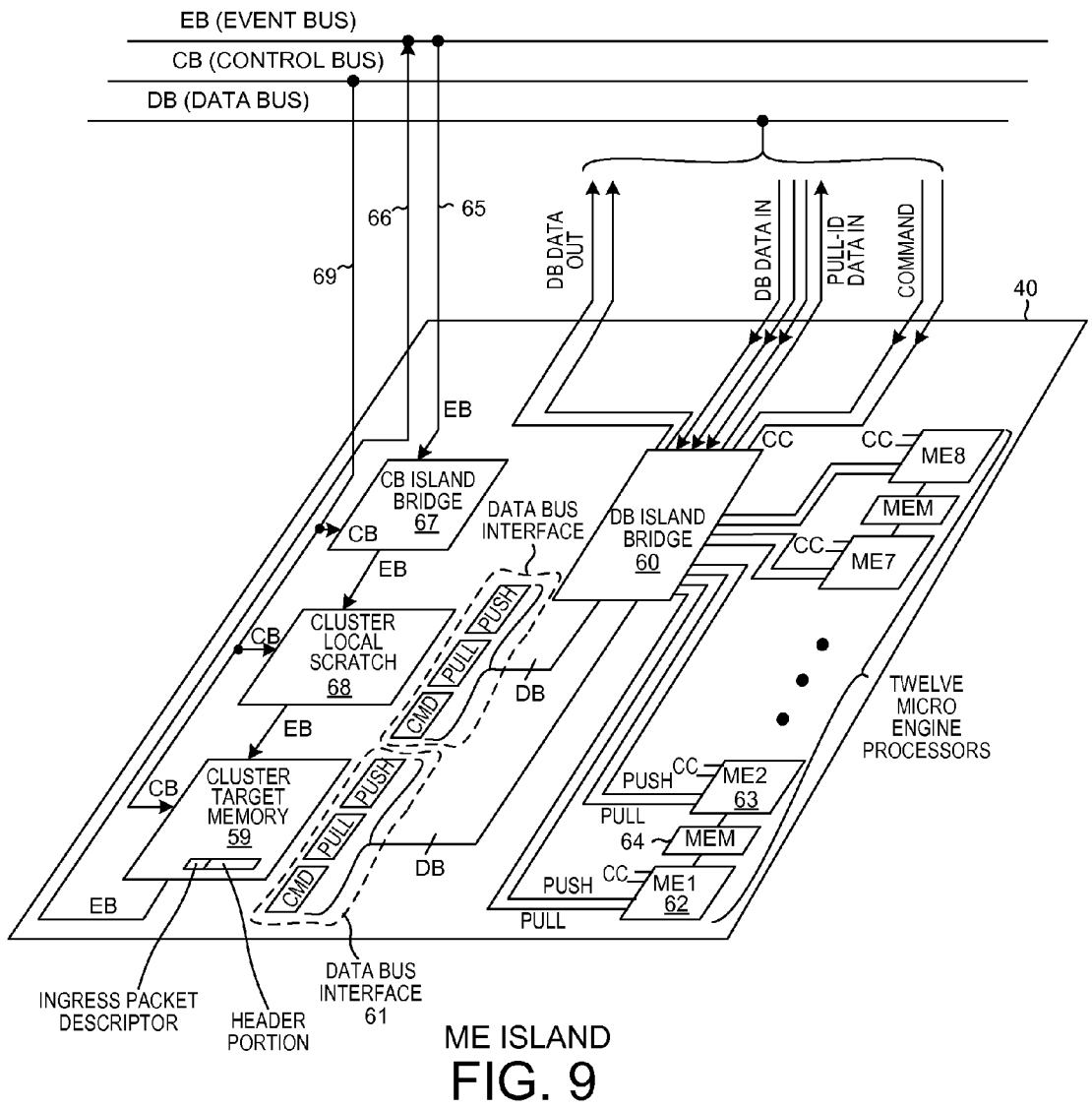
FIG. 9 is a simplified diagram of microengine (ME) island 40 of the IB-NFP integrated circuit of FIG. 1.

ME Island: FIG. 9 is a diagram of the microengine (ME) island 40. In the operational flow of FIG. 1, packet headers and the associated preclassification results are DMA transferred from the ingress NBI island 46 across the configurable mesh data bus and into the Cluster Target Memory (CTM) 59 of ME island 40. A DMA engine in the ingress NBI island 46 is the master and CTM 59 in ME island 40 is the target for this transfer. The packet header portions and the associated ingress packet descriptors pass into the ME island via data bus island bridge 60 and data bus interface circuitry 61. Once in the CTM 59, the header portions are analyzed by one or more microengines. The microengines have, through the DB island bridge 60, a command out interface, a pull-id in interface, a pull-data out interface, and a push data in interface. There are six pairs of microengines, with each pair sharing a memory containing program code for the microengines. Reference numerals 62 and 63 identify the first pair of microengines and reference numeral 64 identifies the shared memory. As a result of analysis and processing, the microengines modify each ingress packet descriptor to be an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

Memory errors and other events detected in the ME island are reported via a local event ring and the global event chain back to the ARM island 25. A local event ring is made to snake through the ME island 40 for this purpose. Event packets from the local event chain are received via connections 65 and event packets are supplied out to the local event chain via connections 66. The CB island bridge 67, the cluster local scratch 68, and CTM 59 can be configured and are therefore coupled to the control bus CB via connections 69 so that they can receive configuration information from the control bus CB.

Figure 10:
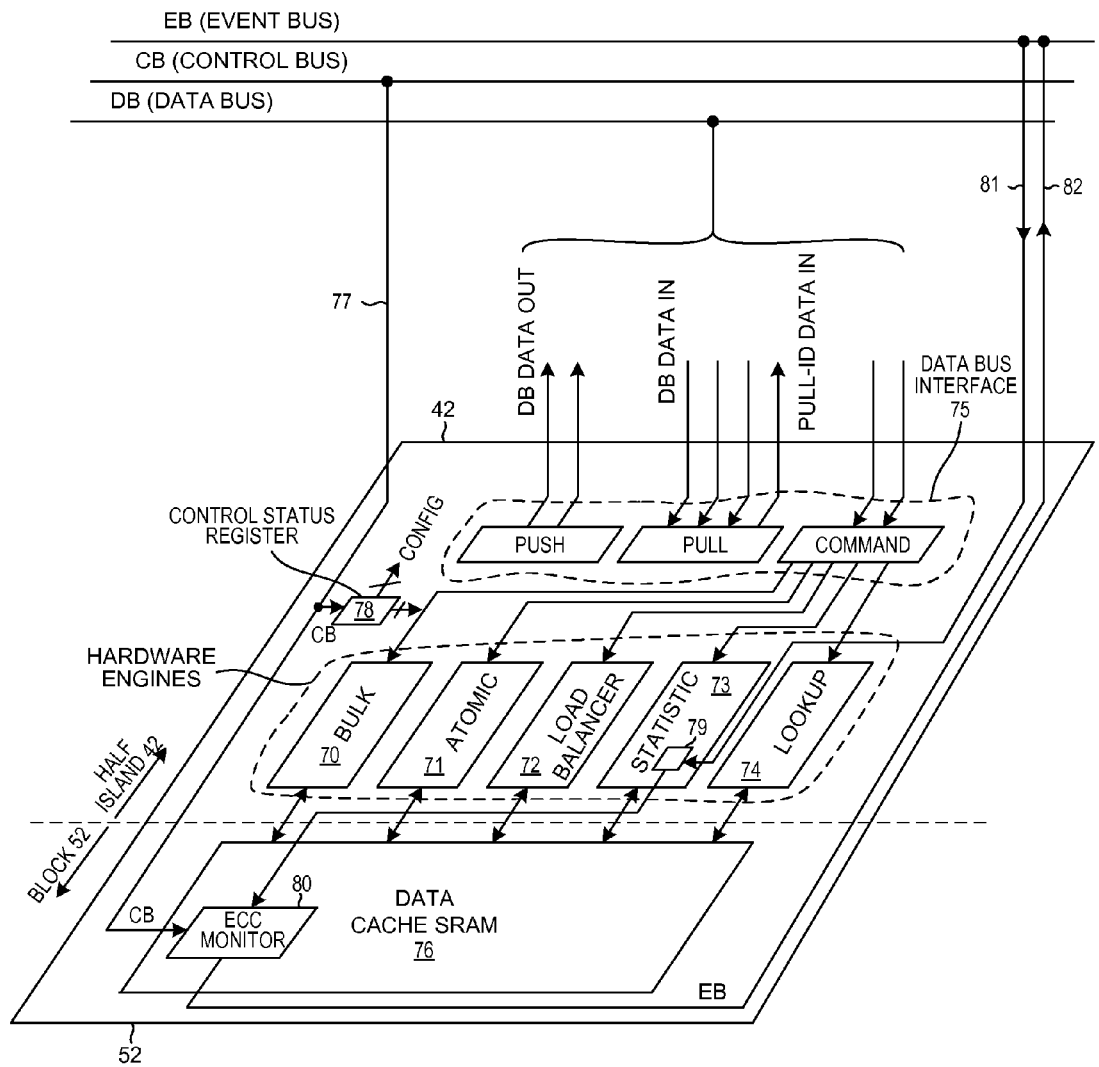
FIG. 10 is a simplified diagram of the memory unit (MU) half island 42 and memory unit (MU) block 52 of the IB-NFP integrated circuit of FIG. 1.

MU Island: FIG. 10 is a diagram of MU half island 42 and SRAM block 52. MU half island 42 includes several hardware engines 70-74. In the operational example, fast path packet payloads are DMA transferred directly from ingress NBI island 46 and across the configurable mesh data bus, through data bus interface 75 of half island 42, and into the data cache SRAM 76 of block 52. The ingress NBI DMA engine issues a bulk write command across the configurable mesh data bus to the bulk transfer engine 70. The destination is the MU island 42. The action is bulk write. The address where the data is to be written into the MU island is the address taken out of the appropriate buffer list. The bulk write command received at the MU is a bulk write, so the data bus interface 75 presents the command to the bulk engine 70. The bulk engine 70 examines the command which is a write. In order to perform a write the bulk engine needs data, so the bulk engine issues a pull-id through the pull portion of interface 75, which in turn issues a pull-id back onto the configurable mesh data bus. The DMA engine in NBI island 46 receives the pull-id. Part of the pull-id is a data reference which indicates to the DMA engine which part of the packet is being requested as data. The DMA engine uses the data reference to read the requested part of the packet, and presents that across the data part of the data bus back to bulk engine 70 in MU island 42. The bulk engine 70 then has the write command and the packet data. The bulk engine 70 ties the two together, and it then writes the packet data into SRAM 76 at the address given in the write command. In this way, fast path packet payload portions pass from DMA engine in the ingress NBI island, across the configurable mesh data bus, through the data bus interface 75, through a bulk transfer engine 70, and into data cache SRAM 76 of block 52. In a similar fashion, exception packet payload portions pass from the DMA engine in ingress NBI island 46, across the configurable mesh data bus, through the data bus interface of half island 44, through the bulk transfer engine of half island 44, and through DDR PHYs 21 and 22, and into external memories 6 and 7.

Various parts of MU island 42 are configurable by changing the contents of registers and memory via the control bus CB and connections 77 and control status registers 78. Errors detected on the MU island by circuits 79 and 80 are reported into a local event ring. Event packets from the local event ring are received via input connections 81 and the MU island outputs event packets to the local event ring via output connections 82.

Figure 11:
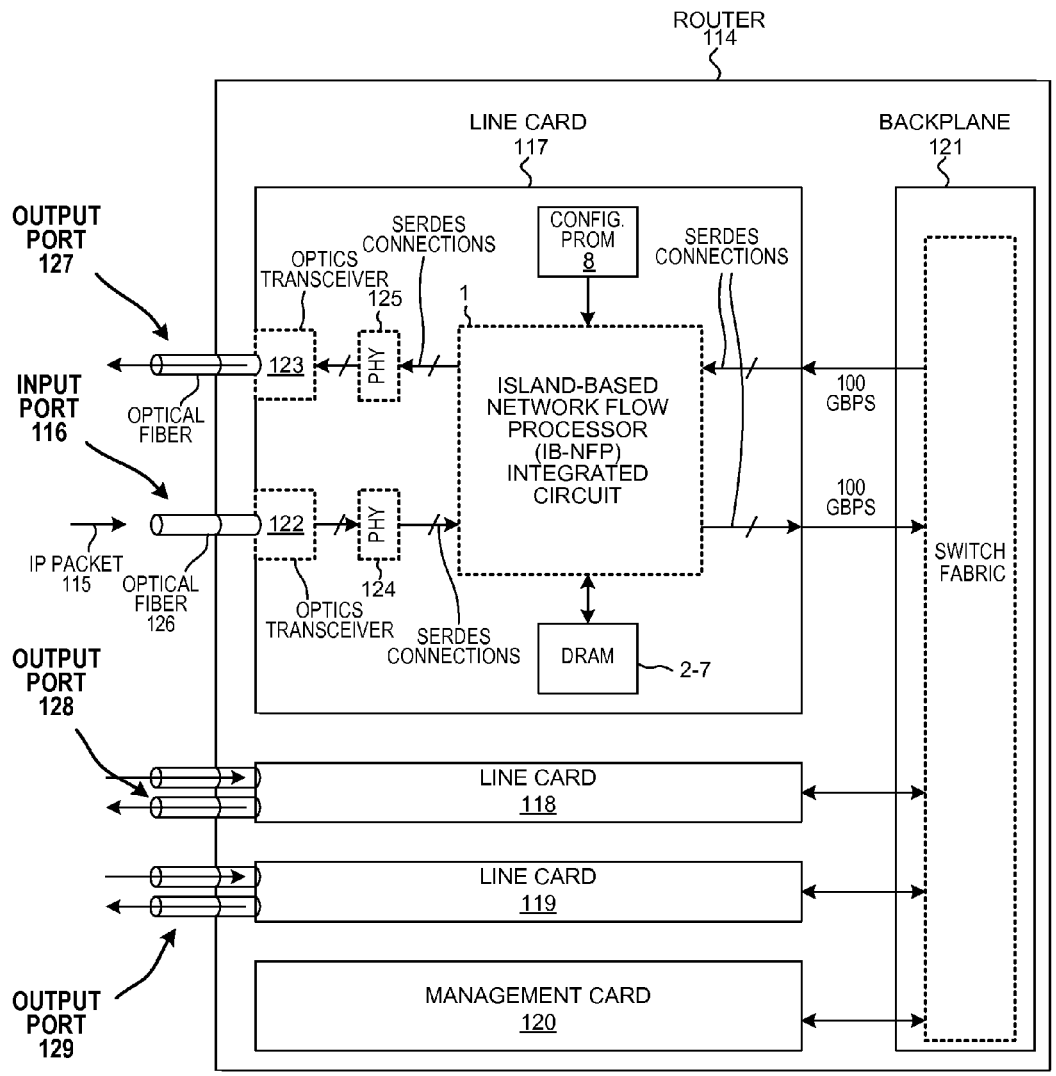
FIG. 11 is a diagram of a network router.

FIG. 11 illustrates a router utilizing the Island-Based Network Flow Processor (IB-NFP) integrated circuit 1 of FIG. 1. Router 114 receives an IP packet 115 on an input port of the router. The input port is one of many virtual ports of a physical input port 116. Router 114 includes a plurality of line cards 117-119 and a management card 120 that fit into and attach to a backplane 121. The line cards are identical. Line card 117 includes optics transceivers 122 and 123, PHYs 124 and 125, an instance of the Island-Based Network Flow Processor (IB-NFP) integrated circuit 1 of FIG. 1, configuration PROM 8, and DRAM integrated circuits 2-7. The IP packet 115 is communicated through optical fiber 126, through optics transceiver 122, through PHY 124, and to IB-NFP 1. The IB-NFP 1 in this router looks at the IP destination address of the packet and identifies one of several output ports to which the IP packet is to be routed. The IB-NFP then forwards the IP packet so that the IP packet will be output from the router via the determined output port. In the illustrated example, the output port may be one of many virtual output ports of physical output port 127, or may be one of the many virtual output ports of physical output port 128, or may be one of the many virtual output ports of physical output port 129. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

Figure 12:
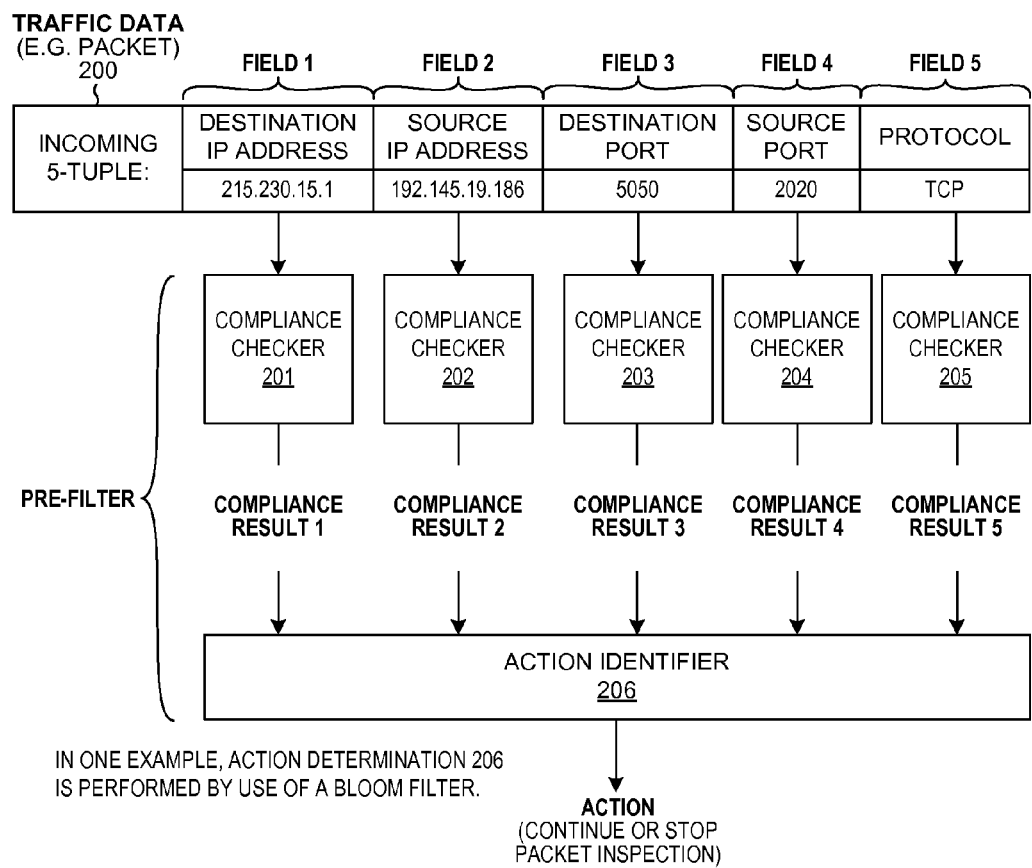
FIG. 12 is a diagram of a parallel rule compliance lookup architecture.

FIG. 12 is a diagram of a parallel rule compliance lookup architecture. Traffic data 200 is received by IB-NFP 1. In one example, traffic data 200 is a five-tuple packet including five fields: destination internet protocol (IP) address, source IP address, destination port, source port, and protocol. Each field is analyzed to determine if the given field complies with a defined set of rules. Each field is analyzed by a separate compliance checker. Field 1 (destination IP address) is analyzed by compliance checker 201. Field 2 (source IP address) is analyzed by compliance checker 202. Field 3 (destination port) is analyzed by compliance checker 203. Field 4 (source port) is analyzed by compliance checker 204. Field 5 (protocol) is analyzed by compliance checker 205. Each compliance checker outputs one or more compliance result values indicating which of the defined set of rules the field complies with and which of the defined set of rules the field does not comply with. These one or more compliance result values are communicated to the action identifier 206. Action identifier 206 analyzes all of the compliance result values and determines if additional inspection of the traffic data is required. An action value output by the action identifier 206 indicates if additional inspection of traffic data is required. In one example, the action value output by action identifier 206 is a single bit that is set to "1" when additional inspection of the traffic data is required, and set to "0" when additional inspection of the traffic data is not required. In another example, the action value output by action identifier 206 is a multi-bit value that indicates the traffic data analyzed to generate the action value. The combination of compliance checkers 201 to 205 and action identifier 206 may be referred to as a pre-filter. This pre-filter operates to distinguish traffic data that requires additional inspection from traffic data that does not require additional inspection.

In one example, action identifier 206 is implemented by use of a Bloom filter. A Bloom filter is a memory space efficient probabilistic data structure that is used to test whether an element is a member of a set. The Bloom filter can generate false positives; however, the bloom filter will never generate a false negative. A Bloom filter will never erroneously indicate that an element is not a member of the set. Therefore, the pre-filter shown in FIG. 12 will never generate an action indicating that additional traffic data inspection is not required when in fact additional inspection is required. Alternatively, the pre-filter shown in FIG. 12 will rarely indicate that additional traffic data inspection is required when in fact additional inspection is not required. The probability of this false positive result occurring is inversely related to the number of bits used to implement the Bloom filter.

Figure 13:
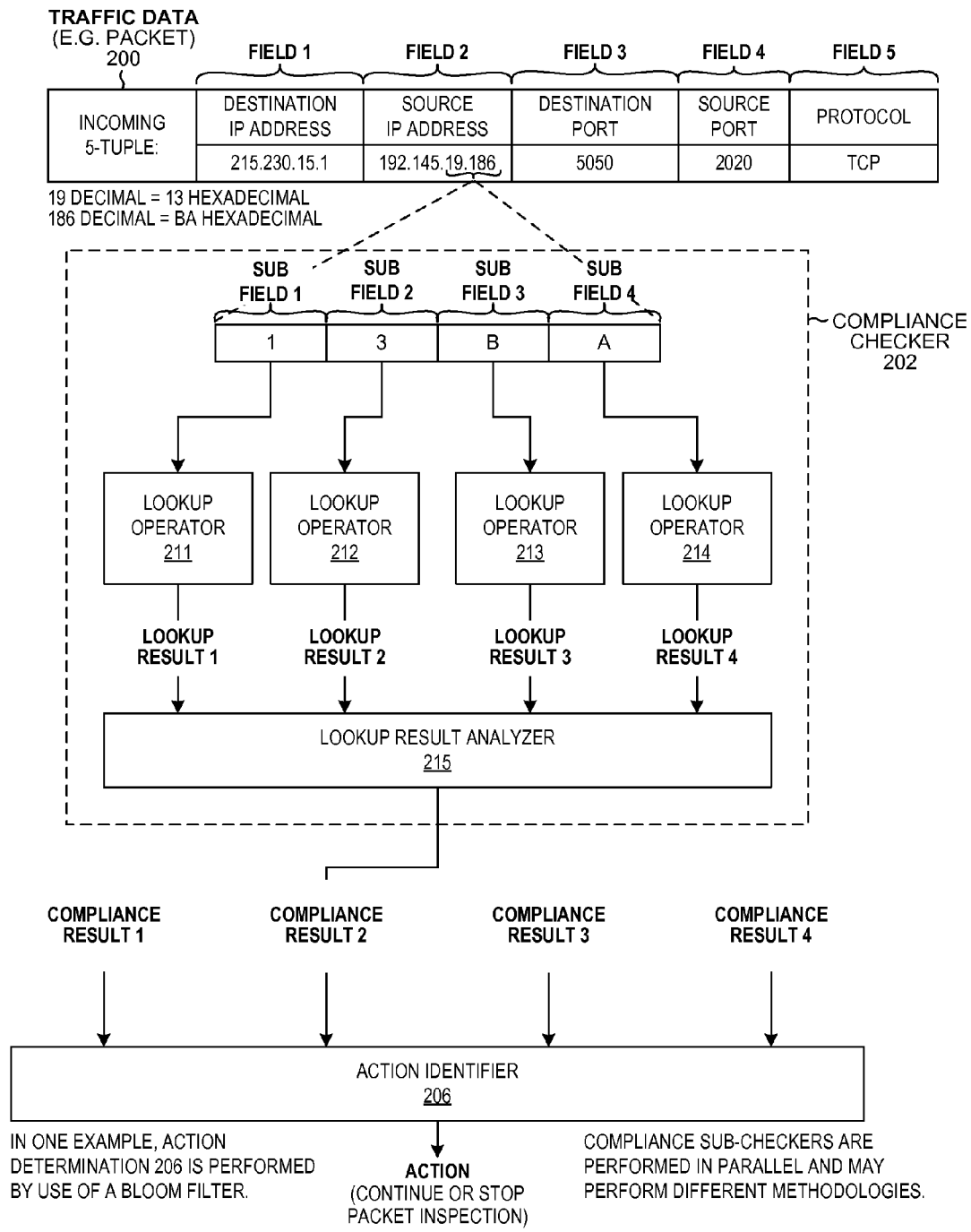
FIG. 13 is a diagram of a parallel sub-field lookup architecture.

FIG. 13 is a diagram of a parallel subfield lookup architecture. FIG. 13 is a detailed diagram of the internal operation of compliance checker 202 shown in FIG. 12. Compliance checker 202 includes lookup operators 211-214 and lookup result analyzer 215. In the example illustrated in FIG. 13, subfields 1-4 of field 2 (Source IP Address) are communicated to compliance checker 202. Compliance checker 202 passes subfield 1 to lookup operator 211, subfield 2 to lookup operator 212, subfield 3 to lookup operator 213, and subfield 4 to lookup operator 214. Lookup operators 211-214, independently and in parallel, perform a lookup operation on subfields 1-4, respectively. The lookup operation is based on a set of values set by the network administrator. In one example, the lookup operation may be setup such that traffic data originating from a certain range of source IP addresses are subjected to additional security inspection. In another example, the lookup operation may be setup such that traffic data from a certain list of source IP addresses are subjected to additional security inspection. For example, FIG. 15 illustrates a set of five-tuple rules. Rule number three in FIG. 15 requires that the source IP address be a value from 192.145.19.128 to 192.145.19.255. Determining if the received traffic data complies with this rule, compliance checker 202 can analyze the two partitions (e.g. 19.186) of the source IP address and determine if the last sixteen bits of the source IP address comply with rule number three. As illustrated in FIG. 16, the incoming traffic data received has a source IP address of 192.145.19.186. FIG. 17 illustrates the mapping of the last two partitions of the source IP address (19.186) to a hexadecimal value (0x13BA) and binary value (0001001110111010). The first four bits (subfield 1, 0001) are passed to lookup operator 211. The second four bits (subfield 2, 0011) are passed to lookup operator 212. The third four bits (subfield 3, 1011) are passed to lookup operator 213. The fourth four bits (subfield 4, 1010) are passed to lookup operator 214.

Figures 18, 19:
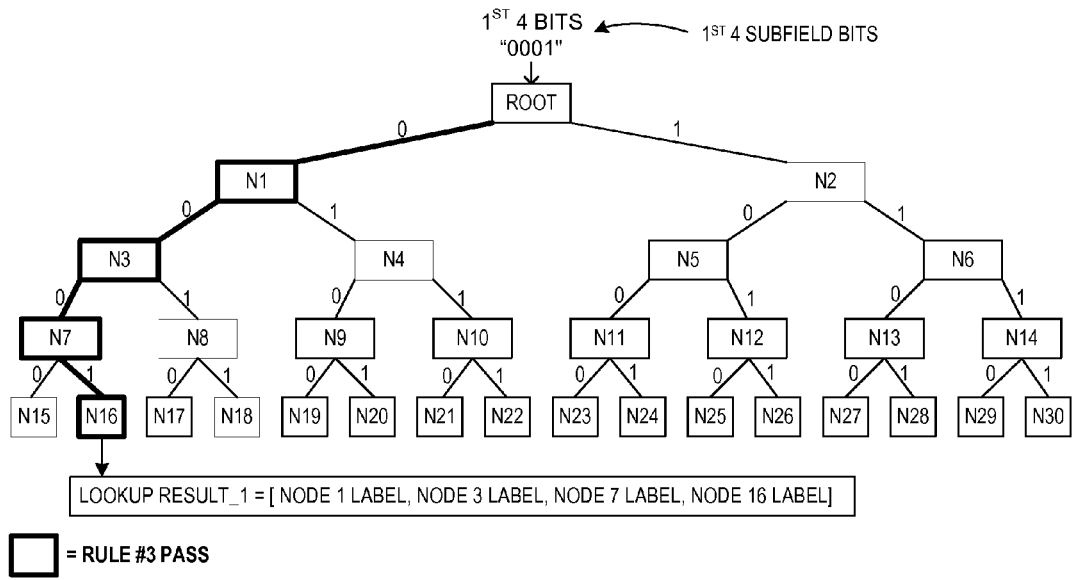
FIG. 18 is a diagram illustrating a segment tree lookup.
FIG. 19 is a table describing exemplary data included in node information.

FIG. 18 illustrates the segment tree operation performed by lookup operator 211 in one example. The segment tree always starts at the "root". The path traveled along the segment tree is determined based upon four bit values passed to the lookup operator. The first bit of subfield 1 (0001) is a "0" therefore the first leg of the segment tree leads to node 1 (N1). The second bit of subfield 1 (0001) is a "0" therefore the second leg of the segment tree leads to node 3 (N3). The third bit of subfield 1 (0001) is a "0" therefore the third leg of the segmented tree leads to node 7 (N7). The fourth bit of subfield 1 (0001) is a "1" therefore the fourth leg of the segmented tree leads to node 16 (N16). Upon completion of the lookup operation, the lookup operator 211 outputs a lookup result indicating that node 1 (N1), node 3 (N3), node 7 (N7), and node 16 (N16) are on the path of the segment tree. An indication that node 16 is on the path of the segment tree indicates that subfield 1 passes the requirements of rule three. FIG. 19 illustrates the node information indicated in the lookup result for each node along the segment tree path. The node information includes a start point, an end point, a unique label, and a counter value that indicates the number of times the node has been in the segment tree path.

Figure 20:
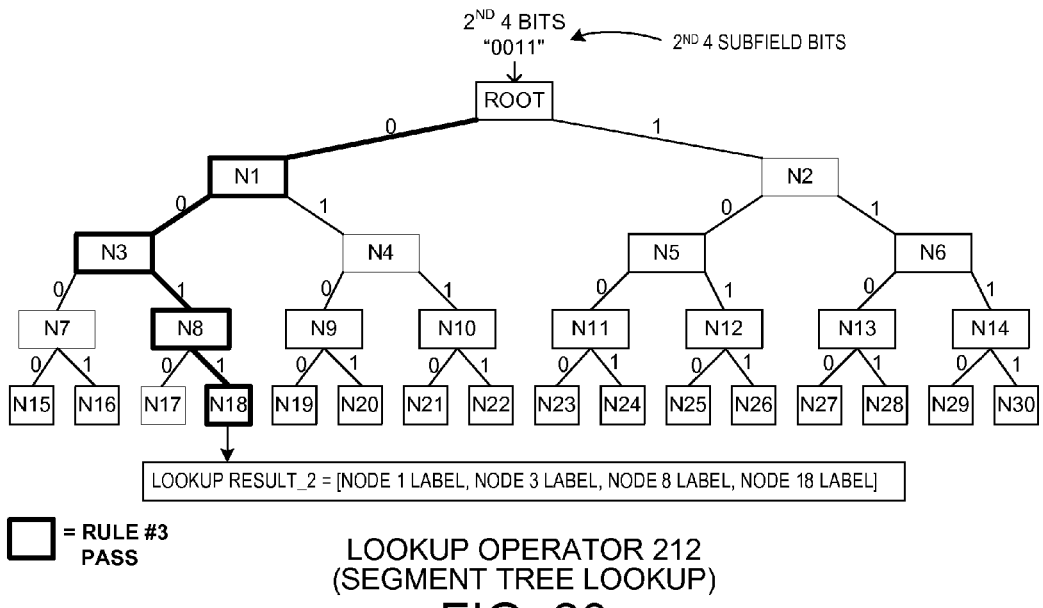
FIG. 20 is a diagram illustrating a segment tree lookup.

FIG. 20 illustrates the segment tree operation performed by lookup operator 212 in one example. The segment tree always starts at the "root". The path traveled along the segment tree is determined based upon four bit values passed to the lookup operator. The first bit of subfield 2 (0011) is a "0" therefore the first leg of the segment tree leads to node 1 (N1). The second bit of subfield 2 (0011) is a "0" therefore the second leg of the segment tree leads to node 3 (N3). The third bit of subfield 2 (0011) is a "1" therefore the third leg of the segmented tree leads to node 8 (N8). The fourth bit of subfield 2 (0011) is a "1" therefore the fourth leg of the segmented tree leads to node 18 (N18). Upon completion of the lookup operation, the lookup operator 212 outputs a lookup result indicating that node 1 (N1), node 3 (N3), node 8 (N8), and node 18 (N18) are on the path of the segment tree. An indication that node 18 is on the path of the segment tree indicates that subfield 2 passes the requirements of rule three.

Figure 21:
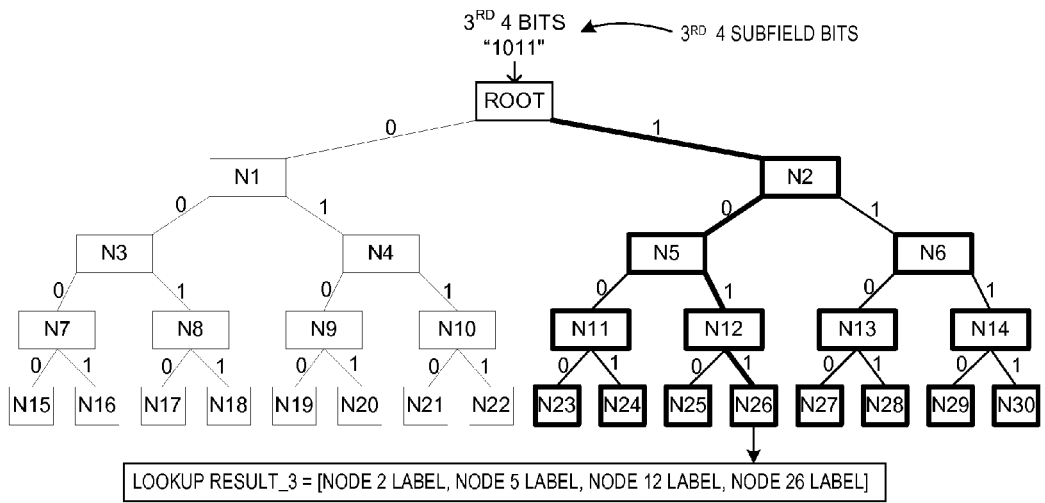
FIG. 21 is a diagram illustrating a segment tree lookup.

FIG. 21 illustrates the segment tree operation performed by lookup operator 213 in one example. The segment tree always starts at the "root". The path traveled along the segment tree is determined based upon four bit values passed to the lookup operator. The first bit of subfield 3 (1011) is a "1" therefore the first leg of the segment tree leads to node 2 (N2). The second bit of subfield 3 (1011) is a "0" therefore the second leg of the segment tree leads to node 5 (N5). The third bit of subfield 3 (1011) is a "1" therefore the third leg of the segmented tree leads to node 12 (N12). The fourth bit of subfield 3 (1011) is a "1" therefore the fourth leg of the segmented tree leads to node 26 (N26). Upon completion of the lookup operation, the lookup operator 213 outputs a lookup result indicating that node 2 (N2), node 5 (N5), node 12 (N12), and node 26 (N26) are on the path of the segment tree. An indication that anyone of nodes N2, N5-N6, N11-N14, or N23-N30 is on the path of the segment tree indicates that subfield 3 passes the requirements of rule three.

Figure 22:
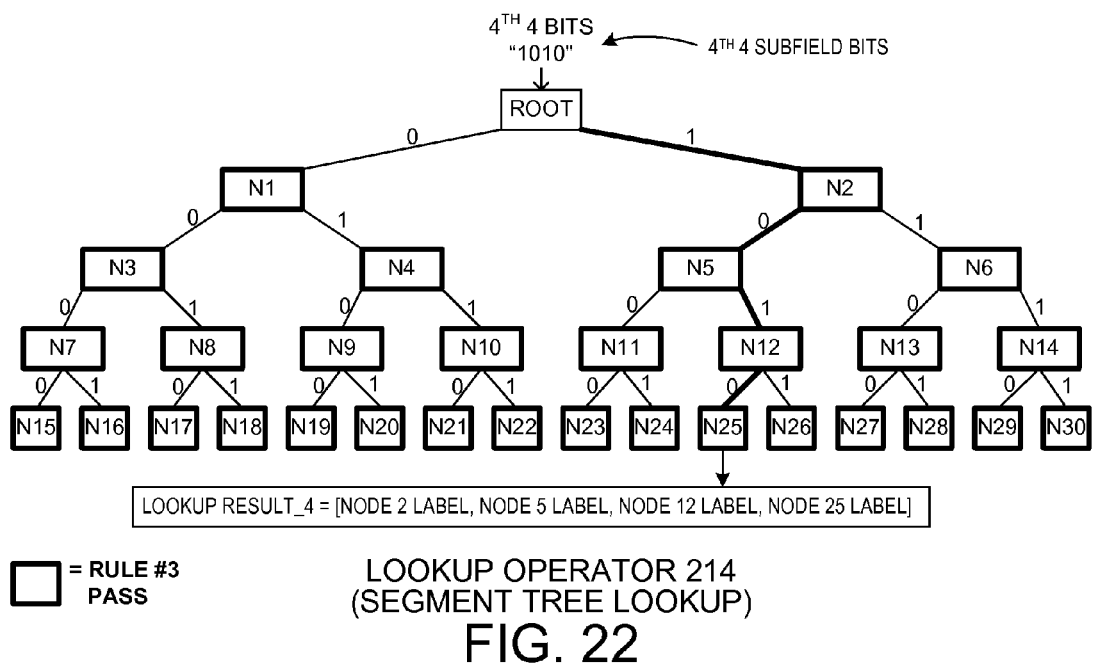
FIG. 22 is a diagram illustrating a segment tree lookup

FIG. 22 illustrates the segment tree operation performed by lookup operator 214 in one example. The segment tree always starts at the "root". The path traveled along the segment tree is determined based upon four bit values passed to the lookup operator. The first bit of subfield 4 (1010) is a "1" therefore the first leg of the segment tree leads to node 2 (N2). The second bit of subfield 4 (1010) is a "0" therefore the second leg of the segment tree leads to node 5 (N5). The third bit of subfield 4 (1010) is a "1" therefore the third leg of the segmented tree leads to node 12 (N12). The fourth bit of subfield 4 (1010) is a "0" therefore the fourth leg of the segmented tree leads to node 25 (N25). Upon completion of the lookup operation, the lookup operator 214 outputs a lookup result indicating that node 2 (N2), node 5 (N5), node 12 (N12), and node 25 (N25) are on the path of the segment tree. An indication that anyone of nodes N1-N30 is on the path of the segment tree indicates that subfield 4 passes the requirements of rule three.

Lookup result analyzer 215 determines if the traffic data complies with the specific rule. The lookup result analyzer 215 in the above example will receive a lookup result 1 from lookup operator 211 indicating that node 1, node 3, node 7, and node 16 are in the segment tree path. Lookup result analyzer 215 will receive a lookup result 2 from lookup operator 212 indicating the node 1, node 3, node 8, and node 18 are in the segment tree path. Lookup result analyzer 215 will receive a lookup result 3 from lookup operator 213 indicating that node 2, node 5, node 12, and node 26 are in the segment tree path. Lastly, lookup result analyzer 215 will receive a lookup result 4 from lookup operator 214 indicating that node 2, node 5, node 12, and node 25 are in the segment tree path. Based on this information, lookup result analyzer 215 will determine that the last two partitions of the source IP address of the traffic data complies with the source IP address portion of rule number three shown in FIG. 15 (19.186 is within the range of 19.128 to 19.255). Simultaneously, lookup result analyzer will determine that the last four numbers of the source IP address do not comply with rule number one and rule number two shown in FIG. 15 (19.186 is not 10.1). The lookup result analyzer 215 can be implemented as a lookup table where the node numbers are used as index values. Lookup result analyzer 215 generates a compliance result based on the lookup result values. The compliance result indicates which of the applicable rules the traffic data complies with and which of the applicable rules the traffic data does not comply with. In one example, the compliance result only includes a listing of rules which the traffic data complies with. In another example, the compliance result only includes a listing of rules which the traffic data does not comply with. In yet another example, the compliance result includes a listing of all rules checked and an indicator of whether the traffic data complies with each rule.

Lookup operators 211-214 perform the above lookup operations in parallel. The specific subfield portion on which the compliance check is performed is programmable and dependent on the specific pre-filtering implementation. For example, the lookup operations described above could similarly be performed on the first two partitions of the source IP address or the first two partitions of the destination IP address. In one example, lookup operators 211-214 can be implemented using executable code running on a processor, such as a software lookup methodology. In another example, lookup operators 211-214 can be implemented using sequential logic, such as a hardware segment tree lookup shown in FIG. 23, a hardware direct 32-bit lookup shown in FIG. 26, or a hardware CAMR-32 bit lookup shown in FIG. 32. In yet another example, lookup operators 211-214 can be implemented with a combination of executable code running on a processor and sequential logic.

Compliance result two is communicated from compliance checker 202 to action identifier 206. Action identifier 206 also receives compliance results from all other compliance checkers 201, 203, and 204. The result of the complete set of compliance results indicates whether the rule is matched or not. In response, action identifier 206 generates an action indicating whether additional inspection of the traffic data is required. Action identifier 206 can be implemented using a lookup table. In another example, action identifier 206 can be implemented using a Bloom filter as described above.

Figure 14:
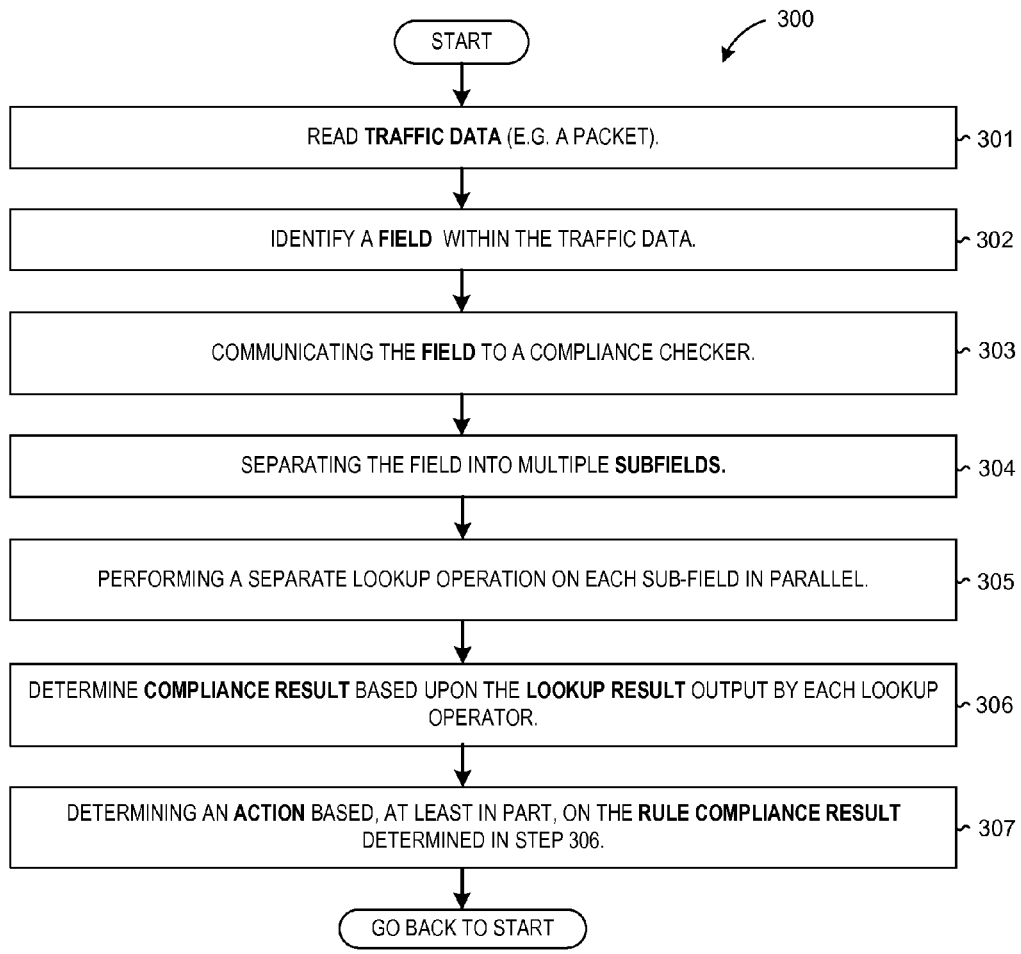
FIG. 14 is a flowchart of a parallel rule compliance lookup architecture.

FIG. 14 is a flowchart of a parallel rule compliance lookup architecture. In step 301 the incoming traffic data is received. In step 302, a field within the traffic data is identified. In step 303, the identified field is communicated to the compliance checker. In step 304 the field is separated in multiple subfields. In step 305 separate lookup operations are performed on each subfield in parallel. In step 306 a compliance result is generated based on each lookup result. In step 307 an action is determined based at least in part on compliance result determined in step 306. The action indicates if additional inspection of the traffic data is required.

In another example, a label is used at each node in the segment trees of FIGS. 18, 20, 21 and 22. Using the 5-bit label identified in FIG. 19, the logic required to implement the segment trees is reduced as each segment tree may be programmed with multiple rules rather than a single match rule.

Figure 23:
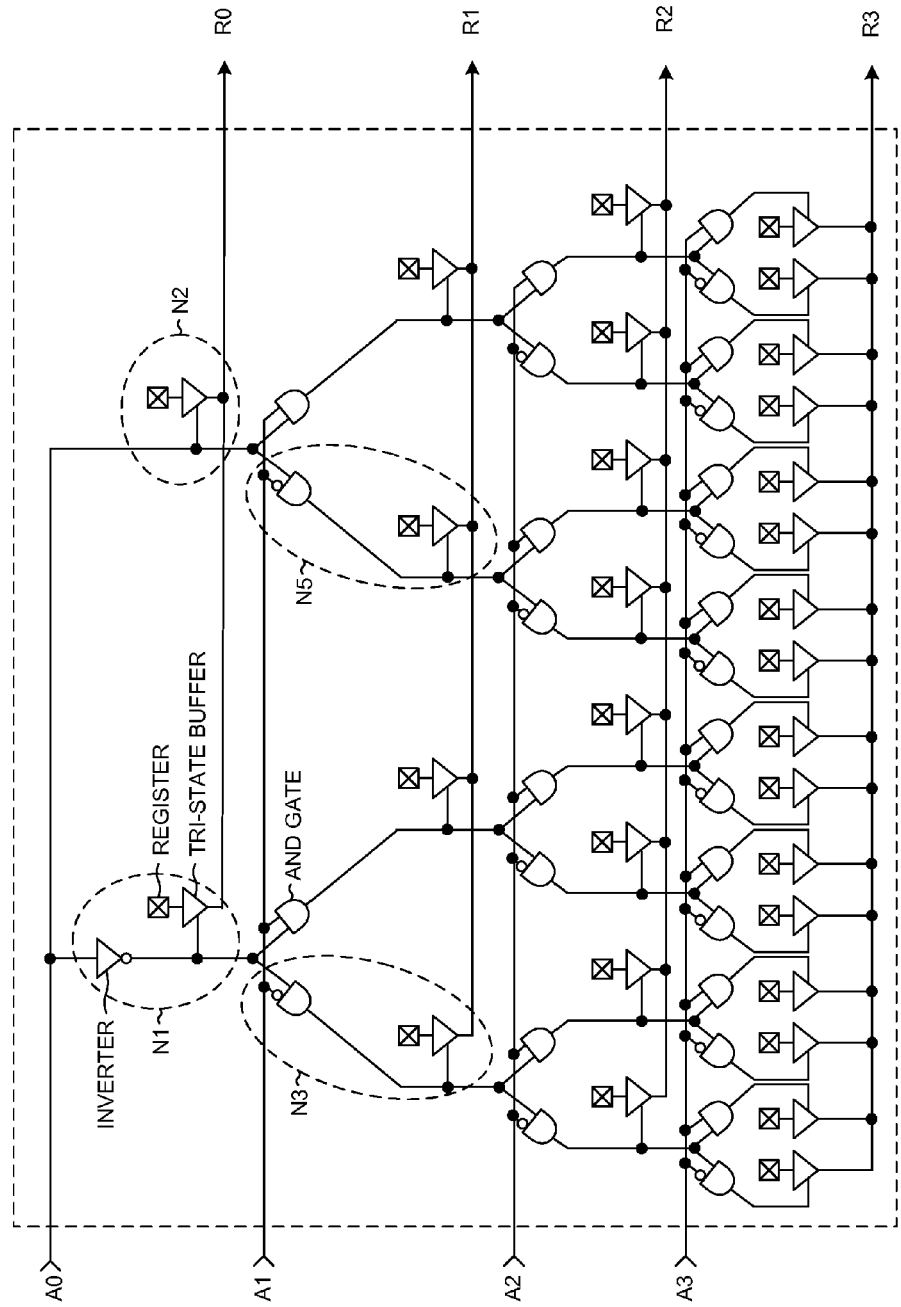
FIG. 23 is a diagram illustrating a segment tree lookup implemented in sequential logic.

FIG. 23 is a diagram illustrating a segment tree lookup implemented in sequential logic. Input bits A0 to A3 are the four bits subfield bits. Output bits R0 to R4 are the lookup result. There is one register per segment tree node. The register for each node is programmed based upon the rule to be applied. As discussed above, in certain situations the traffic data is in compliance with the rule when the segment tree path reaches a specific node. For example, consider the segment tree scenario illustrated in FIG. 21. As discussed above regarding FIG. 21, an indication that anyone of nodes N2, N5-N6, Ni 1-N14, or N23-N30 are on the path of the segment tree indicates that subfield 3 passes the requirements of rule three shown in FIG. 15. Accordingly, the registers associated with nodes N2, N5-N6, N11-N14, or N23-N30 are programmed with a logic high "1" bit value. All remaining nodes are programmed with a logic low "0" bit value.

Node 1 (N1) includes an inverter, a tri-state buffer and a register. Bit A0 is inverted by the inverter and coupled to the enable input of the tri-state buffer. The register is connected to the input of the tri-state buffer. When bit A0 is a logic high "1" then the inverter outputs a logic low "0" and the tri-state buffer is disabled. When bit A0 is a logic low "0" then the inverter outputs a logic high "1" and the tri-state buffer is enabled. When the inverter is enabled the value stored in the register is output as R0.

Node 2 (N2) includes a tri-state buffer and a register. When A0 is a logic high "1" the tri-state buffer is enabled and the value stored in the register is output as R0. When A0 is a logic low "0" the tri-state buffer is disabled and the value stored in the register is not output as R0.

All remaining odd nodes (3-29) have similar configuration. Each node includes an AND gate, a tri-state buffer and a register. One input of the AND gate is an inverted input. The inverted input of the AND gate is coupled to the bit of the present level in the segment tree. The non-inverted input of the AND gate is coupled to output of the node in the previous level of the segment tree. When the output of the node in the previous level of the segment tree is "0" then the output of the AND gate is "0" and the tri-state buffer is disabled. When the output of the node in the previous level of the segment tree is "1" and the bit of the present level of the segment tree is "1" then the AND gate outputs a "0" and the tri-state buffer is disabled. When the output of the node in the previous level of the segment tree is "1" and the bit of the present level of the segment tree is "0" then the output of the AND gate is "1" and the tri-state buffer is enabled and the value stored in the register is output as the result bit for the given level of the segment tree.

All remaining even nodes (4-30) have similar configuration. Each node includes an AND gate, a tri-state buffer and a register. The AND gate does not have any inverted inputs. The first input of the AND gate is coupled to the bit of the present level in the segment tree. The second input of the AND gate is coupled to the output of the node in the previous level of the segment tree. When the output of the node in the previous level of the segment tree is "0" then the output of the AND gate is "0" and the tri-state buffer is disabled. When the output of the node in the previous level of the segmented tree is "1" and the bit of the present level of the segment tree is "0" then the output of the AND gate is "0" and the tri-state buffer is disabled. When the output of the node in the previous level of the segmented tree is "1" and the bit of the present level of the segment tree is "1" then the output of the AND gate is "1" and the tri-state buffer is enabled and the value stored in the register is output as the result bit for the given level of the segment tree. Therefore, when at least one of the output bits R0-R3 are set to a "1" the subfield of the traffic data complies with rule three. This sequential logic can be utilized to implement each of the lookup operators 211-214. FIG. 24 is a diagram illustrating four segment tree lookups with a common input and output bus.

FIG. 25 is a diagram illustrating a rule compliance determination block implemented in combinatory logic. The output bits of lookup operators 211-214 must be processed to determine if the traffic data complies with the field of the rule under analysis. Lookup result R0-R3 from lookup operator 211 are ORed together and the result of the ORing is provided to a first input of an AND gate. Lookup result R4-R7 from lookup operator 212 are ORed together and the result of the ORing is provided to a second input of the AND gate. Lookup result R8-R11 from lookup operator 213 are ORed together and the result of the ORing is provided to a third input of the AND gate. Lookup result R12-R15 from lookup operator 214 are ORed together and the result of the ORing is provided to a fourth input of the AND gate. The output of the AND gate is coupled to an output latch.

Other sequential logic can be utilized to implement lookup operators 211-214. For example, a direct 32-bit lookup or a CAMR 32-bit lookup may be utilized to implement lookup operators 211-214. A detailed description of each lookup methodology is provided below.

FIG. 26 illustrates the values communicated in the lookup engine 74 during a direct 32-bit lookup. In one example, upon receiving an ethernet packet microengine 160 sends a lookup command 6000 to transactional memory 42, 52 via a CPP bus 159. In this example, the purpose of the lookup command 6000 is to determine if additional inspection of the traffic data is required. The lookup command 6000 includes a base address value, a starting bit position value, and a mask size value. The combination of the base address value, starting bit position value, and mask size value is referred to as address information 6003. In another example, the mask size value is predetermined and not included in the address information 6003. The lookup command 6000 is communicated through the data bus interface 75 to state machine selector 5032. State machine selector 5032 monitors the status indicator in each state machine within state machine array 5033 and routes lookup command 6000 to idle state machine SM#1. In response to receiving lookup command 6000, the selected state machine SM#1 issues a pull-id command to the initiating microengine 160.

As shown in FIG. 26, pipeline 5043 includes request stage 5047. Request stage 5047 of the pipeline 5043 is shown in greater detail in FIG. 28. Request stage 5047 includes FIFO F1 6013 and ALU 1 6014. ALU 1 6014 includes selecting circuit 6020 and adding circuit 6012. Selecting circuit 6020 includes barrel shifter 6009 and mask circuit 6010. The request stage of the pipeline supplies the state machine number to the register pool 5038. The register pool 5038 uses the state machine number to return to the pipeline the input value (IP address) 6005 stored in the register pool 5038 for that state machine number. The request stage uses the starting bit position and mask size to select a portion 6015 of the input value (IP address) 6005. In one example, the portion 6015 is an eight bit portion of the input value (IP address) 6005. The portion 6015 is selected by performing a barrel shift operation followed by a masking operation. The barrel shift operation is performed by barrel shifter 6009. Barrel shifter 6009 receives the input value (IP address) 6005 and starting bit position 6016 and generates a shifted version of input value (IP address) 6005. Mask circuit 6010 receives the shifted version of the input value (IP address) 6005 from barrel shifter 6009 and the mask size 6017 and performs a masking operation whereby all bits received from the barrel shifter are masked out with exception to the desired portion bits 6015. In one example, masking circuit 6010 is an array of AND gates where all undesired bits are ANDed with "0" and desired bits are ANDed with "1". The portion bits 6015 are then separated into two different bit groupings. In one example, the portion 6015 is an eight bit value that is separated into a first two bit group PORTION [0:1] and a second six bit group PORTION [2:7]. Adding circuit 6012 receives PORTION [2:7] and base address 6018 and generates memory address 6019. Memory address 6019 is included in read request 6006 (shown in FIG. 26). PORTION [0:1] is communicated to the following stages of the pipeline and is utilized within the lookup stage 5052. Request stage 5047 then issues a read request to memory controller 97 via FIFO 5048 and crossbar switch 95. The memory controller 97 handles reading a single 128-bit word 6007 from the memory location indicated by the read request 6006. FIG. 27 illustrates how the direct 32-bit result values are packed in memory 90.

As shown in FIG. 26, read stage 5050 of pipeline 5043 includes FIFO F2 and ALU 2. In response to the read request 6006 send by request stage 5047, read stage 5050 of the pipeline 5043 receives 128-bit word 6007 from memory 90 via crossbar switch 96 and FIFO 5049. In one example, the 128-bit word 6007 includes four 32-bit result values (as shown in FIG. 27). Read stage 5050 also receives PORTION [0:1] from the read stage 5050. Read stage 5050 then writes both the 128-bit word 6007 and PORTION [0:1] to register R1 5051 within lookup stage 5052.

Figure 30:
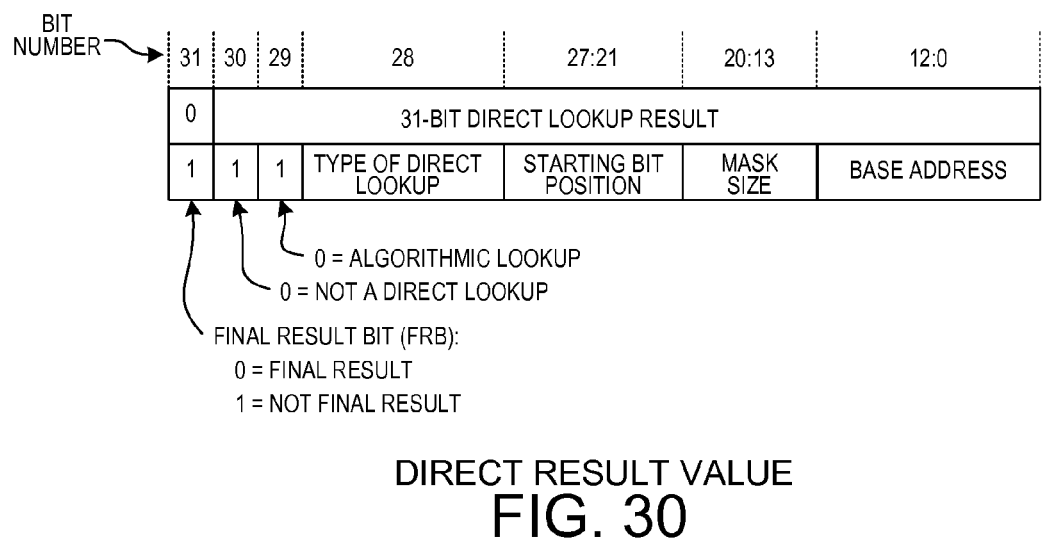
FIG. 30 is a diagram of a direct 32-bit result value.

As shown in FIG. 26, pipeline 5043 includes register lookup stage 5052. Lookup stage 5052 of the pipeline is shown in greater detail in FIG. 29. Lookup stage 5052 includes register R1 5051 and ALU 3 5054. ALU 3 5054 includes a multiplexing circuit 6011. In one example, multiplexing circuit 6011 includes thirty-two one by four multiplexers. multiplexing circuit 6011 receives PORTION [0:1] and the four 32-bit result values from the 128-bit word 6007 received in read stage 5050. The multiplexing circuit 6011 selects one of the four 32-bit result values based upon the value of PORTION [0:1]. The selected 32-bit result value is then written to register R2 5063 of result stage 5064. Result stage 5064 causes the selected result value to be communicated to the initiating state machine. FIG. 30 illustrates exemplary contents of direct result value.

Figure 31:
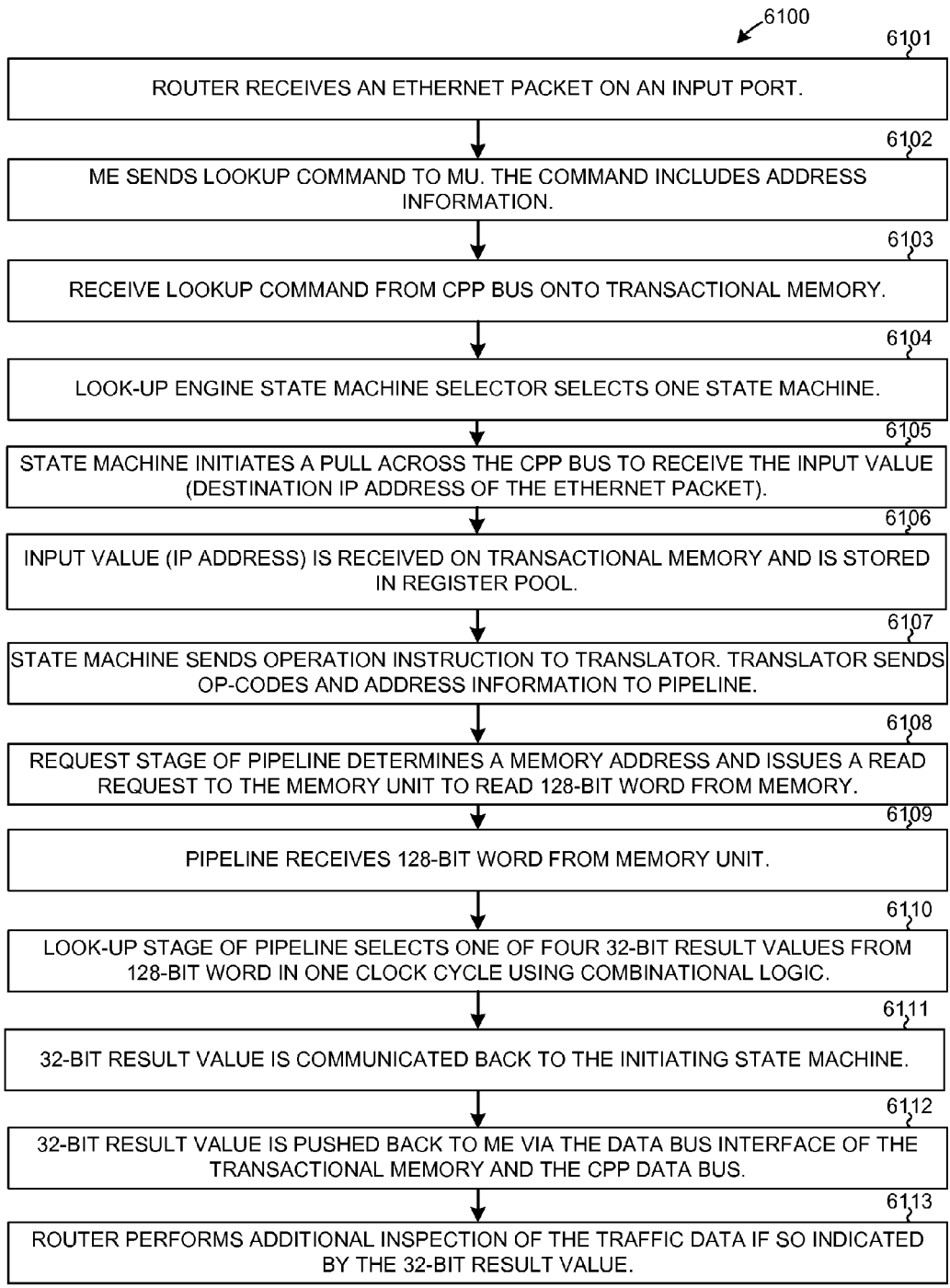
FIG. 31 is a flowchart of a method involving a novel hardware direct 32-bit lookup operation.

FIG. 31 is a flowchart 6100 illustrating the direct 32 bit lookup operation of lookup engine 74. Router receives an ethernet packet on an input port (Step 6101). The ethernet packet includes a destination IP address. The ethernet packet is communicated to a microengine within the router. The microengine sends a lookup command to the transactional memory (Step 6102). The lookup command includes a base address value, a starting bit position value, and a mask size value. The base address value, starting bit position value, and mask size value are referred to as address information. The lookup command is received onto the transactional memory via the CPP bus (Step 6103). In response to receiving the lookup command, an idle state machine is selected to receive the command by a state machine selector (Step 6104). In response to receiving the lookup command, the selected state machine initiates a pull across the CPP bus to read the input value (destination IP address) of the ethernet packet from the microengine (Step 6105). The input value (destination IP address) is then received onto the transactional memory and stored in a register pool (Step 6106). The state machine then sends an operation instruction to a translator that causes the translator to send OP-CODES and address information to the pipeline (Step 6107). The request stage 5047 uses the input value (destination IP address) and the address information to determine a memory address. The request stage 5047 of the pipeline then issues a read request (including the memory address) to the memory unit to read a single 128-bit word (Step 6108). The pipeline then receives the 128-bit word from the memory unit (Step 6109). The lookup stage of the pipeline then selects one of four 32-bit result values from 128-bit word in one clock cycle using combinational logic (Step 6110). The result of the direct 32-bit lookup is a single 32-bit result value. The 32-bit result value is communicated back to the initiating state machine (Step 6111). The 32-bit result value is pushed back from the state machine to the microengine via the data bus interface of the transactional memory and the CPP data bus (Step 6112). The router then performs additional traffic data inspection if indicated to do so by the 32-bit result value (Step 6113).

Op codes 6002 is supplied to each ALU in each state of the pipeline. Op codes 6002 includes one operation code (op code) for each stage of the pipeline. Each operation code includes a plurality of bits. The particular combination of these bits indicates one of several different operation commands. The operation performed in each stage of the pipeline can be varied by changing the op code assigned to a given pipeline stage. For example, the operation of the lookup stage of the pipeline 5043 can be changed from performing a direct 32-bit lookup to a direct 24-bit lookup. This allows flexible programming of each stage of the lookup engine 74 so that various lookup operations can be performed by the single lookup engine.

Figure 32:
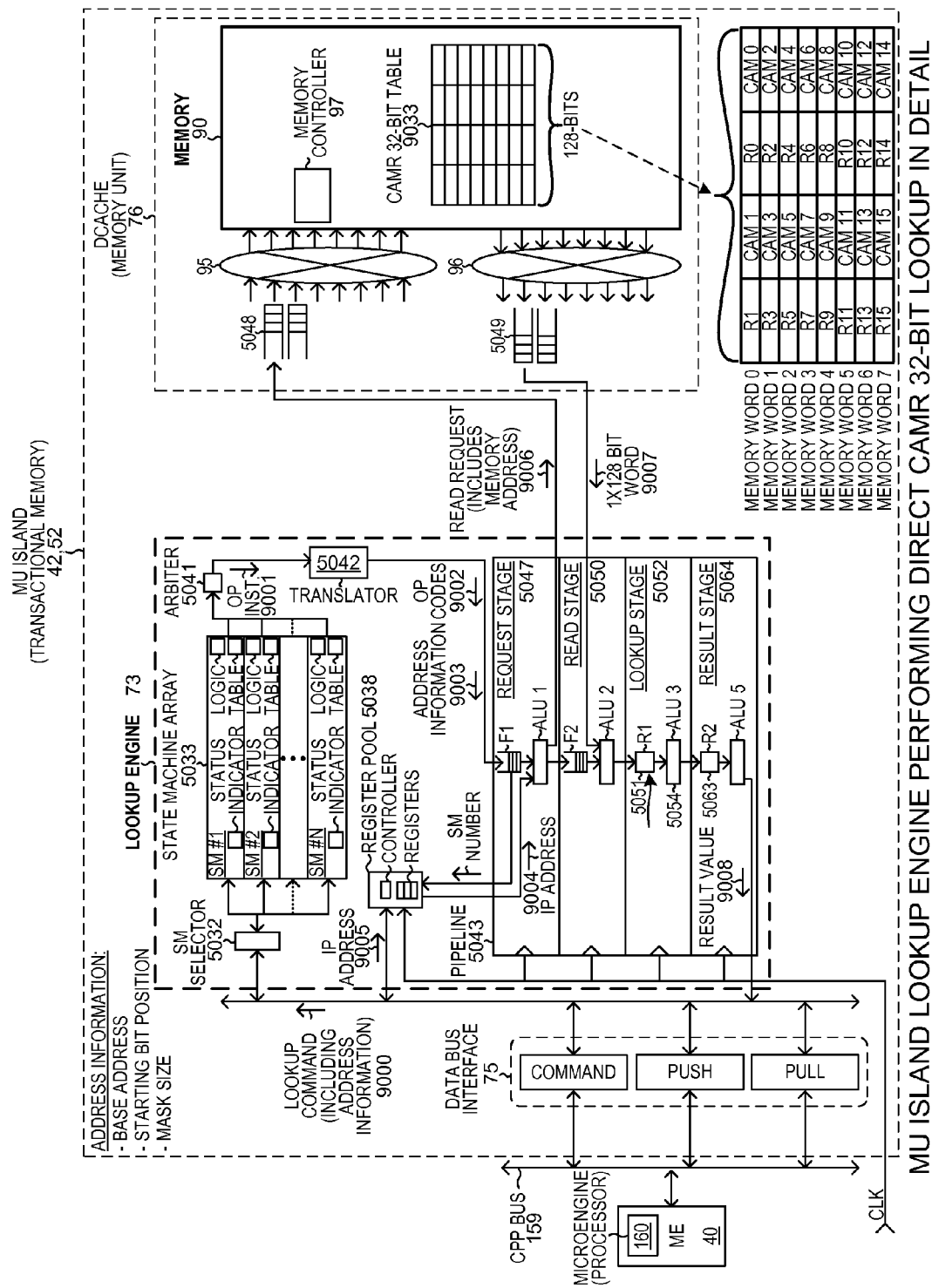
FIG. 32 is a detailed diagram of the lookup engine within the MU island performing a Content Addressable Memory Recursive (CAMR) 32-bit lookup operation.

FIG. 32 illustrates the values communicated in the lookup engine 74 during a CAMR 32-bit lookup operation. In one example, upon receiving an ethernet packet microengine 160 sends a lookup command 9000 to transactional memory 42, 52 via a CPP bus 159. In this example, the purpose of the lookup command 9000 is to determine if additional inspection of the traffic data is required. The lookup command 9000 includes a base address value, a starting bit position value, and a mask size value. The combination of the base address value, starting bit position value, and mask size value is referred to as address information 9003. In another example, the mask size value is predetermined within the lookup engine 74 and not included in the address information 9003. The lookup command 9000 is communicated through the data bus interface 75 to state machine selector 5032. State machine selector 5032 monitors the status indicator in each state machine within state machine array 5033 and routes lookup command 9000 to idle state machine SM#1. In response to receiving lookup command 9000, the selected state machine SM#1 issues a pull-id command to the initiating microengine 160.

FIG. 32 illustrates how the CAMR 32-bit result values and reference values are packed in memory 90. FIG. 32 illustrates one embodiment wherein each memory word includes four memory locations and each memory location is 32-bits wide. The first memory location of "memory word 0" contains a value CAM 0. CAM 0 is a reference value. The second memory location of "memory word 0" contains a value R0. R0 is a result value. Reference value CAM 0 is associated with result value R0. The third memory location of "memory word 0" contains a value CAM 1. CAM 1 is a reference value. The fourth memory location of "memory word 0" contains a value R1. R1 is a result value. Reference value CAM 1 is associated with result value R1. This memory packing structure allows the selection of a specific result value within a memory word by comparing a lookup key value with each reference value in the word and then selecting the result value in the word associated with the matching reference value. In the present embodiment, each memory word includes four memory locations and each memory location is thirty-two bits wide. In other embodiments of the present invention, the number of memory locations within a word and the bit width of each memory location within the word may vary.

As shown in FIG. 32, pipeline 5043 includes request stage 5047. Request stage 5047 of the pipeline 5043 is shown in greater detail in FIG. 34. Request stage 5047 includes FIFO F1 6013 and Arithmetic Logic Unit ("ALU") 1 6014. ALU 1 6014 includes selecting circuit 9020, and adding circuit 9012. Selecting circuit 9020 includes barrel shifter 9009 and mask circuit 9010. The request stage of the pipeline supplies the state machine number to the register pool 5038. The register pool 5038 uses the state machine number to return to the pipeline the input value (IP address) 9005 stored in the register pool 5038 for that state machine number. The request stage uses the starting bit position and mask size to select a PORTION 9015 of the input value (IP address) 9005. In one example, the PORTION 9015 is a thirty-eight bit portion of the input value (IP address) 9005. The PORTION 9015 is selected by performing a barrel shift operation followed by a masking operation. The barrel shift operation is performed by barrel shifter 9009. Barrel shifter 9009 receives the input value (IP address) 9005 and starting bit position 9016 and generates a shifted version of input value (IP address) 9005. Mask circuit 9010 receives the shifted version of the input value (IP address) 9005 from barrel shifter 9009 and the mask size 9017 and performs a masking operation whereby all bits received from the barrel shifter are masked out with exception to the desired PORTION bits 9015. Mask size 9017 represents how many bits are to be masked out from the 128-bit string received from barrel shifter 9009. In one example, the mask size is seven bits wide and represents 90-bits to be masked out of the 128-bit string received from barrel shifter 9009. The result of the masking operation is a thirty-eight bit PORTION [0:37]

9015. In another example, masking circuit 9010 is an array of AND gates where mask size 9017 determines which bits received from barrel shifter 9009 are ANDed with "0" and which bits received from barrel shifter 9009 are ANDed with "1". The PORTION bits 9015 are then separated into two different bit groupings. In one example, the PORTION 9015 is a thirty-eight bit value that is separated into a first six bit PORTION [32:37] and a second thirty-two bit PORTION [0:31]. The first PORTION [32:37] is a word offset value that indicates the offset from the base address in memory to the desired word address in memory. The second PORTION [0:31] is a lookup key value that is to be compared with the reference values within the desired word. In other examples, the hardware engine can select and utilize portions with more or less than thirty-eight bits. The first PORTION [32:37] is coupled to a first input of adding circuit 9012. The base address 9018 is coupled to a second input of adding circuit 9012. The output of adding circuit 9012 is a memory address of the desired 128-bit word in memory 90. Memory address 9019 is included in read request 9006 (shown in FIG. 32). The second PORTION [0:31] (lookup key value) is communicated to the following stages of the pipeline and is utilized within lookup stage 5052. Request stage 5047 then issues a read request 9006 to memory controller 97 via FIFO 5048 and crossbar switch 95. The memory controller 97 handles reading a single 128-bit word 9007 from the memory location indicated by the read request 9006.

As shown in FIG. 32, read stage 5050 of pipeline 5043 includes FIFO F2 and ALU 2. In response to the read request 9006 sent by request stage 5047, read stage 5050 of the pipeline 5043 receives 128-bit word 9007 from memory 90 via crossbar switch 96 and FIFO 5049. In one example, the 128-bit word 9007 includes two 32-bit result values and two 32-bit reference values ("memory word 0" as shown in FIG. 33). Read stage 5050 also receives the second PORTION [0:31] (lookup key value) from the request stage 5047. Read stage 5050 then writes both the 128-bit word 9007 and the second PORTION [0:31] (lookup key value) into register R1 5051 within lookup stage 5052.

As shown in FIG. 33, pipeline 5043 includes register lookup stage 5052. Lookup stage 5052 of the pipeline is shown in greater detail in FIG. 35. Lookup stage 5052 includes register R1 5051 and ALU 3 5054. ALU 3 5054 includes a multiplexing circuit 9011 and comparator circuit 9021. The comparator circuit 9021 includes two comparators 9022, 9023. The lookup key value (PORTION [0:31]) is coupled to a first input of both comparator 9022 and comparator 9023. The first reference value (CAMR 0) is coupled to the second input of comparator 9023. The second reference value (CAMR 1) is coupled to the second input of comparator 9022. Each comparator compares the first input value with the second input value and generates a single output value that indicates whether or not the second input value is equal to the first input value. In one example, the comparator may generate a one bit output value where "0" represents a false result (when first and second input values are not equal) and where "1" represents a true result (when first and second input values are equal). The one bit output value from both comparators 9022, 9023 are combined to generate a two bit value SELECT [0:1]. SELECT [0:1] is coupled to an input of multiplexing circuit 9011. In one example, multiplexing circuit 9011 includes multiplexer 9025. Multiplexing circuit 9025 includes thirty-two one by three multiplexers. Multiplexing circuit 9011 receives the two 32-bit result values from the 128-bit word 9007 received in read stage 5050 and 32-bit value containing all zeros. The multiplexing circuit 9011 selects one of the three 32-bit result values coupled to multiplexing circuit 9011 based upon the value SELECT [0:1]. Result stage 5064 causes the selected result value to be communicated to the initiating state machine. In one example, when the selected result value is the 32-bit value containing all zeros (the final result bit is set to "0") the result value is a final result value and no further lookup operations are performed.

Figure 36:
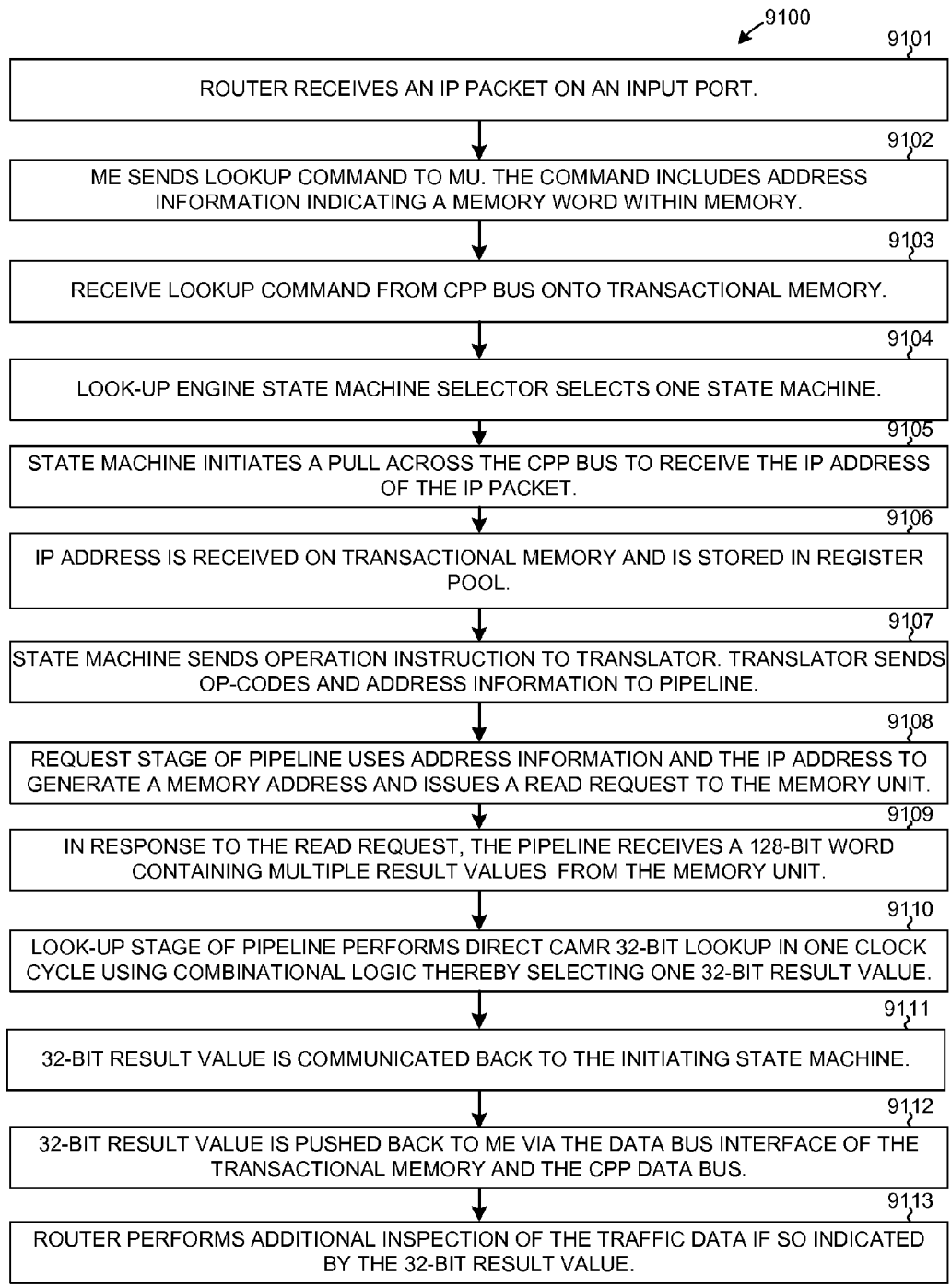
FIG. 36 is a flowchart of a method involving a novel hardware CAMR 32-bit lookup operation.

FIG. 36 is a flowchart 9100 illustrating the CAMR 32-bit lookup operation of lookup engine 74. Router receives an ethernet packet on an input port (Step 9101). The ethernet packet includes a destination IP address. The ethernet packet is communicated to a microengine within the router. The microengine sends a lookup command to the transactional memory (Step 9102). The lookup command includes a base address value, a starting bit position value, and a mask size value. The base address value, starting bit position value, and mask size value are referred to as address information. The lookup command is received onto the transactional memory via the CPP bus (Step 9103). In response to receiving the lookup command, an idle state machine is selected to receive the command by a state machine selector (Step 9104). In response to receiving the lookup command, the selected state machine initiates a pull across the CPP bus to read the input value (destination IP address) of the ethernet packet from the microengine (Step 9105). The input value (destination IP address) is then received onto the transactional memory and stored in a register pool (Step 9106). The state machine then sends an operation instruction to a translator that causes the translator to send OP-CODES and address information to the pipeline (Step 9107). The request stage uses the input value (destination IP address) and the address information to determine a memory address. The request stage of the pipeline then issues a read request (including the memory address) to the memory unit to read a single 128-bit word (Step 9108). The pipeline then receives the 128-bit word from the memory unit (Step 9109). The lookup stage of the pipeline then selects one 32-bit result values from 128-bit word using the lookup key value in one clock cycle using combinational logic (Step 9110). The result of the CAMR 32-bit lookup is a single 32-bit result value. The 32-bit result value is communicated back to the initiating state machine (Step 9111). The 32-bit result value is pushed back from the state machine to the microengine via the data bus interface of the transactional memory and the CPP data bus (Step 9112). The router the performs additional inspection of the traffic data if so indicated by the 32-bit result value (Step 9113).

Op code 9002 is supplied to each ALU in each state of the pipeline. Op code 9002 includes one operation code (op code) for each stage of the pipeline. Each operation code includes a plurality of bits. The particular combination of these bits indicates one of several different operation commands. The operation performed in each stage of the pipeline can be varied by changing the op code assigned to a given pipeline stage. For example, the operation of the lookup stage of the pipeline 5043 can be changed from performing a CAMR 32-bit lookup to a direct 32-bit lookup. This allows flexible programming of each stage of the lookup engine 74 so that various lookup operations can be performed by the single lookup engine.

The embodiments described above disclose efficient complex network traffic management in a non-uniform memory system. The use of multiple processors to simultaneously perform various network traffic management processes provides the ability to produce networking devices that can perform at speeds up to 100 GHz and above.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:
   (a) receiving traffic data onto a networking appliance;
   (b) separating a field within the traffic data into multiple subfields, wherein the separating is performed by a network flow processor;
   (c) performing a lookup on each subfield in parallel, wherein each lookup generates a lookup result, wherein the parallel lookups are performed by a plurality of lookup operators;
   (d) determining a compliance result based on the multiple lookup results generated in (c);
   (e) determining an action based at least in part upon the compliance result determined in (d), wherein the network flow processor is an Island-Based Network Flow Processor, wherein the determining of (d) is performed by a lookup result analyzer, and wherein the determining of (e) is performed by an action identifier.

2. The method of claim 1, wherein a different lookup operation is performed on each subfield.

3. The method of claim 1, wherein the same lookup operation is performed on each subfield.

4. The method of claim 1, wherein the traffic data is a five-tuple packet, and wherein the field is a source IP address.

5. The method of claim 1, wherein the determining of (d) is performed by a lookup result analyzer, and wherein the lookup result analyzer performs a cross product calculation.

6. The method of claim 1, wherein the determining of (e) is performed by an action identifier, and wherein the action identifier is a bloom filter.

7. The method of claim 1, further comprising:
   (f) concluding all inspection of the traffic data when the action determined in (e) indicates that additional traffic data inspection is not required.

8. The method of claim 1, further comprising:
   (f) performing additional inspection of the traffic data when the action determined in (e) indicates that additional traffic data inspection is required.

* * * * *